US012596661B2

(12) United States Patent
Wong et al.

(10) Patent No.: US 12,596,661 B2
(45) Date of Patent: Apr. 7, 2026

(54) SYSTEM AND METHOD FOR SYNCHRONIZED WAKE UP AND PACKET POLLING SYSTEM FOR WIRELESS INPUT/OUTPUT (IO) DEVICES AND WIRELESS RADIO SYSTEM OF AN INFORMATION HANDLING SYSTEM

(71) Applicant: Dell Products, LP, Round Rock, TX (US)

(72) Inventors: Kai Leong Wong, Singapore (SG); Jui Chang Liu, New Taipei City (TW); Karthikeyan Krishnakumar, Austin, TX (US)

(73) Assignee: DELL PRODUCTS LP, Round Rock, TX (US)

( * ) Notice: Subject to any disclaimer, the term of this patent is extended or adjusted under 35 U.S.C. 154(b) by 0 days.

(21) Appl. No.: 18/227,967

(22) Filed: Jul. 30, 2023

(65) Prior Publication Data

US 2025/0036585 A1     Jan. 30, 2025

(51) Int. Cl.
*G06F 13/20*          (2006.01)

(52) U.S. Cl.
CPC .......... *G06F 13/20* (2013.01); *G06F 2213/40* (2013.01)

(58) Field of Classification Search
CPC ............................... G06F 1/3296; G06F 3/167
See application file for complete search history.

(56) References Cited

U.S. PATENT DOCUMENTS

| | | | |
|---|---|---|---|
| 7,801,099 B2 | 9/2010 | Desai | |
| 7,853,663 B2 | 12/2010 | Hoerl | |
| 8,364,080 B2 | 1/2013 | Desai | |
| 8,913,599 B2 | 12/2014 | Gonikberg | |
| 9,100,813 B2 | 8/2015 | Lovich | |
| 9,591,565 B2 | 3/2017 | Park | |
| 9,913,215 B2 | 3/2018 | Vleugels | |
| 2003/0033452 A1* | 2/2003 | Himmel | H04W 74/06 |
| | | | 710/2 |
| 2004/0127254 A1* | 7/2004 | Chang | G06F 8/61 |
| | | | 455/557 |
| 2005/0094709 A1* | 5/2005 | Lakkis | H04B 1/7176 |
| | | | 375/130 |
| 2017/0003736 A1* | 1/2017 | Turon | G06F 1/3296 |
| 2020/0019517 A1* | 1/2020 | Chazot | G06F 3/167 |

FOREIGN PATENT DOCUMENTS

EP          1841149 B1    11/2017

* cited by examiner

*Primary Examiner* — Getente A Yimer

(74) *Attorney, Agent, or Firm* — Prol Intellectual Property Law, PLLC; H. Kenneth Prol

(57) ABSTRACT

A wireless input/output (IO) device synchronized wakeup and packet polling system of a wireless communication dongle at an information handling system may comprise a wireless radio system in a receive (RX) mode to monitor a designated radio frequency (RF) wake channel upon a timeout without wireless communications from a wireless IO device, the controller to receive a request to connect on the designated RF wake channel from the wireless IO device upon a wake event at the wireless IO device, the wireless radio system to respond by switching to a transmit (TX) mode and transmitting instructions for a data packet communication frame having a selected number and length of data packets to be sent at selected time slots, and the wireless radio system to receive the data packet communication frame.

20 Claims, 5 Drawing Sheets

SYSTEM AND METHOD FOR SYNCHRONIZED WAKE UP AND PACKET POLLING SYSTEM FOR WIRELESS INPUT/OUTPUT (IO) DEVICES AND WIRELESS RADIO SYSTEM OF AN INFORMATION HANDLING SYSTEM

FIELD OF THE DISCLOSURE

The present disclosure generally relates to wireless peripheral input/output (IO) devices, such as mice, keyboards, earbuds, headphones, headsets, and virtual reality peripherals. More specifically, the present disclosure relates to a wireless communication from an information handling system, operating independently from the information handling system operating system (OS) for orchestrating streamlined transmission by one or more wireless peripheral IO devices of data packets to the information handling system and a synchronized waking of a wireless peripheral IO device and a wireless communication dongle or wireless radio system of an information handling system from respective sleep states that decreases power consumption.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, video communication capabilities, and audio capabilities. The information handling system may be operatively coupled to one or more peripheral input/output devices such as a keyboard, mouse, touchpad, display device, wearable peripheral device, speakers, earbud, headphone, microphone, or other peripheral devices.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
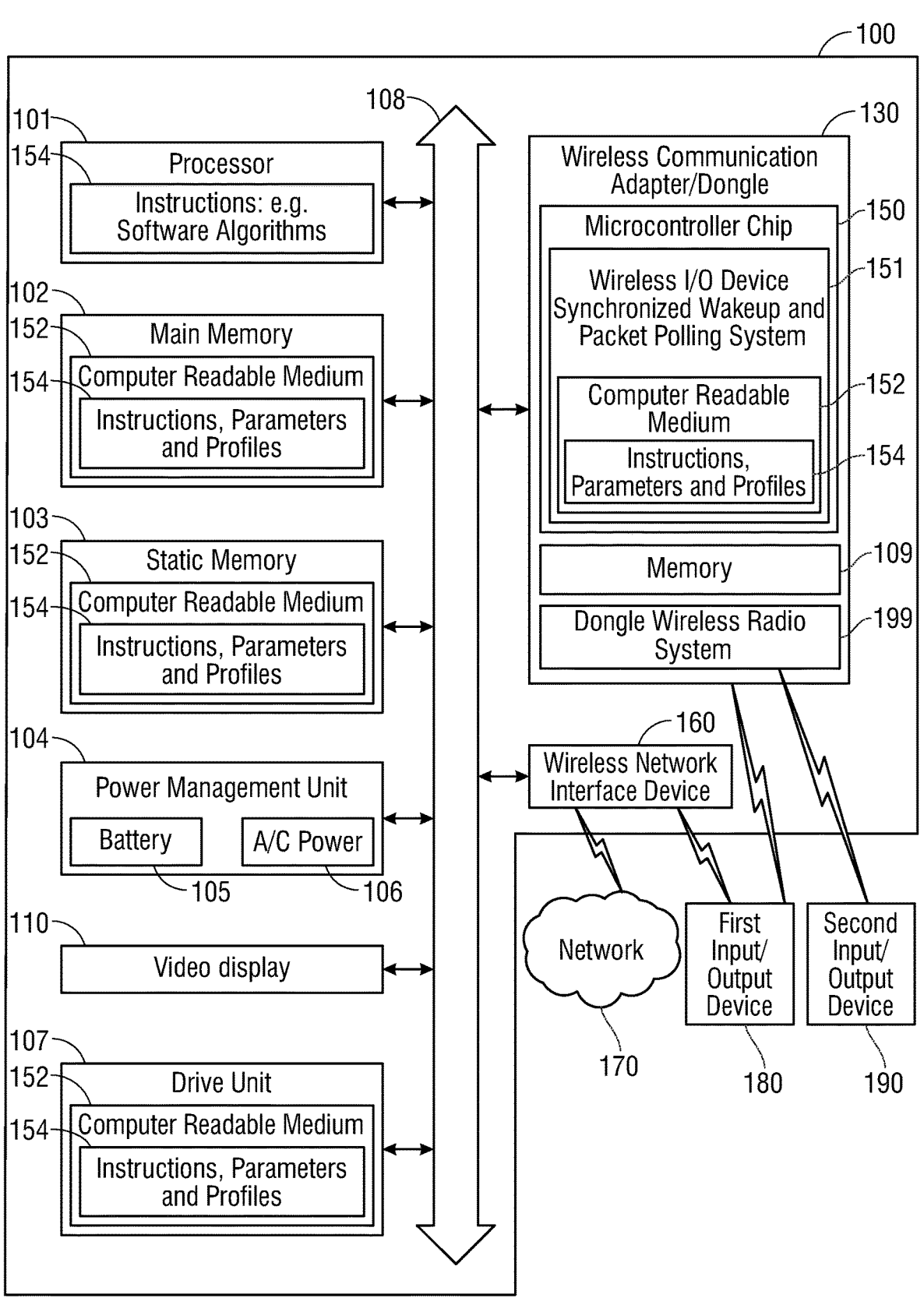
FIG. 1 is a block diagram illustrating an information handling system with a wireless radio system or operatively coupled to a wireless communication dongle orchestrating wireless communication with plural wireless input/output (IO) devices according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Users of information handling systems such as smart phones, tablets, or laptops may employ a plurality of wireless peripheral input/output (IO) devices, also referred to as wireless IO devices herein, (e.g., mouse, keyboard, earbuds, headphones, smart speakers, headsets including headphones and speakers, or virtual reality peripherals) located remotely from the information handling system to wirelessly transmit and receive IO data such as keystrokes, mouse positional data, or audiovisual information. Many existing systems employ a wireless communications dongle operably connected to the information handling system (e.g., desktop, laptop, or tablet computer) to pair with and communicate wirelessly with one or more of these wireless IO devices. In other embodiments, a wireless communication dongle may be integrated as part of the wireless radio adapter internal to the information handling system for pairing with and communicating wirelessly with one or more of these wireless IO devices. Many manufacturers of these wireless IO devices build these devices to provide the most basic or rudimentary communication capabilities that comply with the Bluetooth® Low Energy (BLE) communication standard.

For example, many existing wireless IO devices are designed to communicate with a wireless communications dongle using a one reception/one transmission (1RX/1TX) format that requires a wireless communications dongle to respond to every data packet received from a wireless IO device by transmitting an acknowledgment (ACK) data packet. In other words, each time the wireless communications dongle operating in receive mode receives a data packet, it must then switch to transmit mode and transmit an ACK data packet back to the wireless IO device from which the initial data packet was received. The wireless communications dongle may then switch back to a receive mode to receive the next data packet from the wireless IO device. This process may be repeated each time a new data packet is generated at the wireless IO device, for example. More specifically, in the case of a wireless mouse, this process may be repeated each time the wireless mouse determines the location of the mouse has changed, prompting a correlated change in the position of a cursor within a display device for the information handling system. Thus, this mode-switching may occur multiple times per second in some cases.

Further, in these existing systems, when the wireless communication dongle or wireless radio system of the information handling system ceases receipt of data packets from a paired wireless IO device, the wireless communication dongle or wireless radio system may routinely broadcast packets until it receives a response from the wireless IO device. This may occur, for example, when the wireless IO device has powered down or entered a sleep mode. Moreover, a wireless IO device may be unable to turn off its radio completely in sleep mode, wasting battery in some embodiments. Upon each transmission of such a broadcast, the wireless communication dongle or wireless radio system of the information handling system may then switch back to a receive mode to listen for a response before transmitting another broadcast. This routine transmission of broadcasts on behalf of the wireless communications dongle or wireless radio system to the paired wireless IO device may consume power (e.g., power supplied to the radio system for transmission), and may unnecessarily clutter the radio frequencies across channels in the wireless communication band for Bluetooth® Low Energy (BLE) communications protocol on which data packets are transmitted by one or more wireless IO devices within range. This increase in power consumption and congestion of airtime and with periodic transmission to a responding wireless IO devices by the wireless communications dongle that may be unnecessary while the wireless IO device remains in a sleep or low power state.

A system is needed to decrease power consumed, and decrease use of airtime, which causes more congestion of communication of data packets between one or more wireless IO devices and wireless radio adapters such as wireless communications dongles to provide greater power conservation of the information handling system and wireless communications dongle while operating according to the BLE communication protocol. Further, a system is needed that in some embodiments provides for the wireless IO device to shut off its wireless radio in sleep mode and conserve battery power.

The wireless IO device synchronized wakeup and packet polling system in embodiments of the present disclosure addresses these issues by synchronizing wake up of the wireless IO device and the wireless communications dongle or wireless radio system of the information handling system to avoid unnecessary transmission of broadcasts by the wireless communication dongle or wireless radio system while the wireless IO device remains in a sleep state. Further, the wireless IO device may fully power down its radio until moved or otherwise woken to save battery according to some embodiments.

This synchronized wake up method may be achieved due to the orchestration of a wake event at the wireless IO device, via a controller of the wireless communication dongle or wireless radio system. In an embodiment, the wireless dongle radio system operates in a low power listening mode on an agreed wake channel or couple of wake channels for a request to connect from the wireless IO device upon wakeup of a wireless IO device. This request to connect upon a wake event at the wireless IO device turns on the wireless IO device radio and causes a request to connect signal be sent on the designated wake channel before scheduled delivery, via transmitting a polling packet from the wireless dongle with instructions for a plurality of data packets from each of one or more wireless IO devices in a data packet communication frame according to embodiments herein. The data packet communications frame is delivered from the wireless IO devices between delivery of ACK data packets to each of those one or more wireless IO devices in later or subsequent polling packets according to embodiments herein. For example, during a sleep state, no transceiving of data packets between a wireless IO device and a wireless communications dongle or a wireless radio system of an information handling system occurs and the wireless dongle does not transmit polling packets. Instead, the wireless dongle uses low power receiver mode on a handful of designated wake channels (e.g., up to three wake channels) among a plurality of channels in a wireless communication band such as a BLE communication band for a request to connect message from an operably coupled wireless IO device. The wireless radio adapter, such as in a wireless communications dongle, may receive a request to connect from one or more wireless IO devices (e.g., mouse and keyboard), and then may respond to the request to connect by transmitting a polling packet that instructs each of the wireless IO devices paired with the wireless communications dongle that have requested to connect to transmit a plurality of data packets of a specified length and at specified time slots during a first data packet communication frame between the wireless communications dongle and each of the paired wireless IO devices.

A microcontroller at the wireless communications dongle may ensure that, during such a data packet communication frame in which time slots have been allocated to the one or more wireless IO devices (e.g., mouse and keyboard), the wireless radio system, such as in the wireless communication dongle, remains in a receive mode to receive the instructed selected number of data packets from the one or more paired wireless IO devices in accordance with the number of packets prescribed and the duration (e.g., based on packet lengths) from each of the one or more wireless IO devices in instructions within the poling packet. Following the data packet communication frame, at the end of a time period determined by the number of packets expected, packet lengths, and any spacing time, the controller of the wireless communications dongle or other wireless radio adapter may switch to transmit mode and transmit to each of the paired wireless IO devices an acknowledgement identifying the number of packets received during the data packet communication frame from each of the paired wireless IO devices in the next polling packet. In addition, this packet may further include instructions for the one or more paired wireless IO devices to transmit the specified plural number of data packets of a specified length and at specified time slots during a second data packet communication frame between the wireless communications dongle and each of the paired wireless IO devices. This synchronized communication between the wireless IO device and the wireless communication dongle or wireless radio system of an information handling system may allow the wireless communication dongle to remain in a listening or RX mode during periods in which the wireless IO device has been instructed to transmit data packets during the data packet communication frames.

The embodiments of the present disclosure also place the wireless communications dongle or wireless radio system of an information handling system in a listening or RX mode that consumes less power and avoids congestion of periodic polling when it has been determined that the wireless IO device is no longer transmitting data packets, or has entered a sleep mode. In such a case, a controller may execute code instructions of the wireless IO device synchronized wakeup and packet polling system to place the wireless communication dongle or wireless radio system in a low-power receive (RX) mode to listen on a designated wake channel or a handful of designated wake channels in embodiments herein. In other words, when the wireless communication dongle or wireless radio system stops receiving data packets from the wireless IO device, the controller may assume, after a timeout period or number of polling packets that the wireless IO device has entered a sleep or low power mode. The wireless IO device may then turn off its radio to conserve battery power but have stored an designated wake channel or channels on which to send a request to connect upon next wakeup. In order to conserve energy, the controller may then set the wireless communication dongle or wireless radio system to a listen or RX mode to await the wireless IO device waking and initiating a new communication request on one or a limited number of designated wake channels with the wireless communications dongle or wireless radio system. Upon waking, the wireless IO device in embodiments of the present disclosure may turn on its radio in a receive (RX) mode to listen for polling packets between the wireless communication dongle and other wireless IO devices. If no such polling packet is received, this may indicate that the wireless communication dongle is currently in a low-power RX mode and awaiting new connection requests from one or more wireless IO devices. In such a case, the controller for the wireless IO device that has just woken may switch its wireless radio system to a transmit (TX) mode and transmit a new connection request, prompting the wireless communications dongle or wireless radio system to switch to a TX mode and transmit a polling packet for a new data packet communication frame on the same or another clear channel. If a polling packet is received, the wireless communication dongle is communicating data with other wireless IO device or devices. In the latter embodiment, the wireless IO device will listen to the other wireless IO device(s) data packets and then transmit a request to connect in an extra time span that serves as a reserved provisional timeslot at the end of the data packet communication frame with the wireless communication dongle.

In such a way, the wireless IO device synchronized wakeup and packet polling system may synchronize with a wake event and decrease the frequency of polling and transmissions during a sleep mode period for a wireless IO device in some embodiments. Further, during transmission of data packets wirelessly, wireless IO device synchronized wakeup and packet polling system may reduce the number of ACK data packets transmitted, and the frequency of mode-switching during orchestrated wireless BLE packet communications between a wireless communications dongle and a wireless IO device while improving performance, as described above relative to existing systems. This may further decrease power consumed by rapid mode-switching and unnecessary polling of both wireless IO devices and the wireless communication dongle.

FIG. 1 illustrates an information handling system 100 according to several aspects of the present disclosure. As described herein, an information handling system 100 or a controller 150 of a wireless communications dongle or integrated wireless radio adapter 130 operably connected to the information handling system 100 may execute code instructions of a wireless input/output (IO) device synchronized wakeup and packet polling system 151 in an embodiment to synchronize a wakeup method for one or more paired wireless input/output (IO) devices (e.g., 180 and 190) and a wireless communications dongle or integrated wireless radio adapter 130 of an information handling system 100. It is appreciated that information handling system 100 may use a wireless communications dongle or integrated wireless radio adapter 130 to wirelessly communicate with one or more wireless IO devices 180 or 190. In embodiments herein, wireless communications dongle 130 may refer to a dongle operatively coupled to the information handling system 100 such as via a port or may be integrated within the information handling system 100 such as with an integrated wireless radio adapter with antenna system for wireless communication with the wireless IO devices 180 or 190. In various embodiments a wireless communications dongle 130, whether integrated or not within the information handling system 100 may operate using the Bluetooth® Low Energy (BLE) radio layer protocol (e.g., BLE radio with Gaussian Frequency Shift Keying (GFSK) data modulation) as modified with the wireless IO device communication protocol of embodiments herein. An information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. The information handling system 100 may include a memory 102, (with computer readable medium 152 that is volatile (e.g. random-access memory, etc.), nonvolatile memory (read-only memory, flash memory etc.) or any combination thereof), one or more hardware processing resources including hardware processor 101, such as a central processing unit (CPU), a graphics processing unit (GPU), a Visual Processing Unit (VPU) or a Hardware Accelerator, any one of which may be the hardware processor 101 illustrated in FIG. 1, a hardware controller, an embedded controller (EC), or any combination thereof. Additional components of the information handling system 100 may include one or more storage devices 103 or 107, a wireless network interface device 160, and one or more communications ports for communicating with external devices such as wireless communication adapter/dongle 130 (referred to herein as a wireless communications dongle). A power management unit (PMU) 104 supplying power to the information handling system 100, via a battery 105 or an alternating current (A/C) power adapter 106 may supply power to one or more components of the information handling system 100, including the hardware processor 101, the wireless network interface device 160, a static memory 103 or drive unit 107, the wireless communication adapter/dongle 130, a video display 110, or other components of an information handling system. The video display 110 in an embodiment may function as a liquid crystal display (LCD), an organic light emitting diode (OLED), a flat panel display, or a solid-state display. The information handling system 100 may also include one or more buses (e.g., 108) operable to transmit communications between the various hardware components.

The information handling system 100 in an embodiment is operably coupled to a wireless communications dongle 130, which may orchestrate scheduled delivery of a plurality of data packets from each of a plurality of wireless input/output (IO) devices (e.g., 180 and 190) during scheduled data packet communication frames according to various embodiments of the present disclosure. The wireless communication dongle 130 or integrated wireless radio adapter in an embodiment may house a microcontroller 150 executing firmware instructions of the wireless IO device synchronized wakeup and packet polling system 151 in an embodiment. The wireless communication dongle 130 may be operatively coupled to the information handling system 100 through insertion of the wireless communication dongle 130 within a USB port of the information handling system 100 in an embodiment, for example. In another embodiment, the wireless communication dongle 130 may be incorporated within the housing of the information handling system 100 as part of an integrated wireless radio adapter and operatively coupled to the bus 108 of the information handling system 100 through one of several means for transmitting data, including connection through a USB hub, a Thunderbolt hub, or any other type of data transfer hub known in the art.

The wireless communication dongle 130 in an embodiment may be wirelessly coupled to one or more wireless input output (IO) devices 180 and 190 capable of wirelessly receiving and transmitting data via Bluetooth® Low Energy (BLE) radio layer protocol (e.g., BLE radio with Gaussian Frequency Shift Keying (GFSK) data modulation) with the wireless communication adapter/dongle 130 as modified with the wireless IO device communication protocol of embodiments herein. In some embodiments, the wireless IO devices 180 or 190 may comprise a mouse, keyboard, speaker, headphones, earbuds, headset including a microphone, or various virtual reality peripherals including a headset or handheld input devices. Information handling system 100 may be any information handling system, such as a smart phone, tablet, or laptop, used with a wireless IO device 180 or 190.

The wireless communication dongle wireless radio system 199 or other integrated wireless radio adapter in an embodiment may be capable of communication between the information handling system 100 and the paired wireless IO devices 180 and 190 using a wireless link established using Bluetooth® Low Energy (BLE) radio layer protocol (e.g., BLE radio with Gaussian Frequency Shift Keying (GFSK) data modulation), for example. The wireless communication dongle wireless radio system 199 or other integrated wireless radio adapter in an embodiment may transmit and receive information necessary to pair the wireless IO devices 180 and 190 with the information handling system 100, such as, for example, pairing or wireless communication profiles for pairing the information handling system 100 and the wireless IO devices 180 and 190. Such pairing or wireless communication profiles may operate to identify the wireless IO devices 180 and 190 as a device authorized to transceive data with the information handling system 100 under the paired wireless protocol, as well as information sufficient to identify the wireless IO devices 180 and 190, such as a Media Access Control (MAC) address, IP address, or model number. The pairing or wireless communication profiles may further include a designated radio frequency wake channel or limited number of wake channels upon which the wireless IO device (e.g., 180 or 190) is instructed to transmit requests to connect to the wireless communications dongle 130 upon switching from a sleep mode to a waking state pursuant to execution of code instructions of the wireless IO device synchronized wakeup and packet polling system 151.

The wireless communication dongle wireless radio system 199 may provide connectivity of the wireless communication dongle 130 operatively coupled to the information handling system 100 via wireless links to one or more operatively coupled wireless input/output devices 180 or 190, such as mouse, keyboard, earbuds, headphones, smart speakers, or virtual reality peripherals, as described in greater detail herein. Such wireless links may be established pursuant to Bluetooth® Low Energy (BLE) radio layer protocol (e.g., BLE radio with Gaussian Frequency Shift Keying (GFSK) data modulation), for example. In some embodiments, Bluetooth® Low Energy (BLE) radio layer protocol (e.g., BLE radio with Gaussian Frequency Shift Keying (GFSK) data modulation) may be used to establish a Private Area Network (PAN) (e.g., 170) in which the information handling system 100 may communicate wirelessly with any wireless IO devices (e.g., 180 and 190) paired to the PAN 170 using the wireless IO device communication protocol of embodiments herein. The PAN 170 in such an embodiment may communicate data between the information handling system 100 and any paired wireless IO devices (e.g., 180 and 190) over short distances using Ultra High Frequency (UHF) radio waves in the Industrial, Scientific, and Medical purposes bands (ISM bands) between 2.402 and 2.48 GHz. Reference to Bluetooth® may refer to either or both of the Bluetooth® or Bluetooth Low Energy (BLE) and any revision of those protocols.

In some aspects of the present disclosure, the wireless communication dongle wireless radio system 199 may operate two or more wireless links. In other aspects of the present disclosure, the wireless communication dongle 130 may include a plurality of wireless communication dongle wireless radio systems, each capable of establishing a separate wireless link to one of the plurality of wireless IO devices (e.g., 180 or 190), such that the wireless communication dongle 130 may be in communication with a plurality of wireless IO devices (e.g., 180 and 190) via a plurality of wireless links.

The wireless communication dongle wireless radio system 199 may also operate in accordance with any Bluetooth® Low Energy (BLE) radio layer protocols (e.g., BLE radio with Gaussian Frequency Shift Keying (GFSK) data modulation) as modified with the wireless IO device communication protocol of embodiments herein. To communicate with a wireless personal area network (WPAN), standards including IEEE 802.15 WPAN standards, Service Discovery Protocol (SDP), Radio Frequency Communications (RFCOMM) protocol, Telephony control protocol (TCS), or Logical Link Control and Adaptation Protocol (L2CAP). Utilization of radiofrequency communication bands according to several example embodiments of the present disclosure may include bands used with the WPAN standards which may use frequency bands such as those within the 2.400 to 2.4835 GHZ Industrial, Scientific, and Medical (ISM) band.

The present disclosure contemplates a computer-readable medium that includes instructions, parameters, and profiles 154 or receives and executes instructions, parameters, and profiles 154 responsive to a propagated signal, so that a device connected to the wireless communication dongle wireless radio system 199 may communicate voice, video or data to the wireless communication dongle 130. The wireless communication dongle 130 may include a set of instructions 154 that may be executed via a microcontroller 150, for example, to cause the wireless communication dongle 130 to perform any one or more of the methods or computer-based functions disclosed herein. For example, instructions 154 may include a particular example of a wireless IO device synchronized wakeup and packet polling system 151, or other aspects or components. Application instructions 154 may also include any application processing drivers, or the like executing on information handling system 100 or wireless communication dongle 130.

The wireless IO device synchronized wakeup and packet polling system 151 may utilize a computer-readable medium 152 in which one or more sets of instructions 154 may operate in part as firmware instructions executed by microcontroller 150 on the wireless communication dongle 130. The instructions 154 may embody one or more of the methods as described herein. For example, instructions relating to the wireless IO device synchronized wakeup and packet polling system 151 in firmware, software, or a combination including firmware algorithms, processes, and/or methods may be stored here. More specifically, instructions 154 may be executed by microcontroller integrated circuit 150 or other processing resources such as an embedded controller (EC) or the processor 101 to orchestrate transmission of data packets from one or more wireless IO devices 180 and 190 with the wireless communication dongle 130 during a data packet communication frames according to embodiments herein. In other embodiments, the instructions 154 may be executed via a controller within the integrated wireless network interface device or wireless radio adapter 160 of the information handling system 100.

Memory 109 located and controlled by the wireless communication dongle 130 may contain computer-readable medium (not shown), such as RAM in an example embodiment. An example of memory 109 includes random access memory (RAM) such as static RAM (SRAM), dynamic RAM (DRAM), non-volatile RAM (NV-RAM), or the like, read only memory (ROM), another type of memory, or a combination thereof. The instructions, parameters, and profiles 154 of the wireless IO device synchronized wakeup and packet polling system 151 may be stored in memory 109 on a computer-readable medium 152 such as a flash memory or magnetic disk in an example embodiment, or may be stored in main memory 102, static memory 103, or within drive unit 107. After an initial pairing process between the wireless communication dongle 130 and a plurality of wireless IO devices (e.g., 180 and 190), the microcontroller 150 may execute code instructions 154 of the wireless IO device synchronized wakeup and packet polling system 151 to orchestrate transmission of a plurality of data packets from one or more of the wireless IO devices (e.g., 180 or 190) during one or more data packet communication frames, as described in embodiments herein.

The information handling system 100 may include a memory 102, (with computer readable medium 152 that is volatile (e.g. random-access memory, etc.), nonvolatile memory (read-only memory, flash memory etc.) or any combination thereof), one or more processing resources, such as a central processing unit (CPU), a graphics processing unit (GPU), a Visual Processing Unit (VPU) or a Hardware Accelerator, any one of which may be the processor 101 illustrated in FIG. 1, hardware or software control code instructions, or any combination thereof. Additional components of the information handling system 100 may include one or more storage devices 103 or 107, a wireless network interface device 160, one or more communications ports for communicating with external devices, as well as various input and output (IO) devices 110, such as a keyboard, a mouse, touchpad or any combination thereof. A power management unit 104 supplying power to the information handling system 100, via a battery 105 or an alternating current (A/C) power adapter 106 may supply power to one or more components of the information handling system 100, including the processor 101, the wireless network interface device 160, various components of the wireless communication dongle 130 (e.g., microcontroller chip 150, memory 109, or wireless communication dongle wireless radio system 199), a static memory 103 or drive unit 107 or other components of an information handling system. The information handling system 100 may include a processor 101 such as a central processing unit (CPU), a GPU, a Visual Processing Unit (VPU), or a hardware accelerator, embedded controllers or some combination of the same. Any of the processing resources may operate to execute code that is either firmware or software code.

The wireless network interface device 160 in an embodiment may be capable of communication between the information handling system 100 and network 170 (e.g., LAN, WLAN, WAN, WLAN) in some embodiments. The wireless network interface device 160 may provide connectivity of the information handling system 100 to the network 170 via a dedicated link, a network access point (AP) or base station in an embodiment. The network 170 in other embodiments may be a wired local area network (LAN), a wireless personal area network (WPAN), a wireless Local Area Network (WLAN), such as a public Wi-Fi communication network, a private Wi-Fi communication network, or other non-cellular communication networks. In other embodiments, the network 170 may be a wired wide area network (WAN), a wireless wide area network (WWAN), such as a 4G LTE public network, or a 5G communication network, or other cellular communication networks, including future protocol communication networks such as upcoming 6G protocols under development. Connectivity to any of a plurality of networks 170, one or more APs for those networks, or to a docking station in an embodiment may be via wired or wireless connection. In some aspects of the present disclosure, the network interface device 160 may operate two or more wireless links. In other aspects of the present disclosure, the information handling system 100 may include a plurality of network interface devices, each capable of establishing a separate wireless link to network 170, such that the information handling system 100 may be in communication with network 170 via a plurality of wireless links.

In some embodiments, software, firmware, dedicated hardware implementations such as application specific integrated circuits, programmable arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations may include distributed processing, component/object distributed processing, and parallel processing. Alternatively, virtual computer system processing may be constructed to implement one or more of the methods or functionalities as described herein.

While the computer-readable medium is shown to be a single medium, the term "computer-readable medium" includes a single-medium or multiple-media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In some embodiments, dedicated hardware implementations such as application specific integrated circuits, programmable arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module may include software or firmware executing on hardware, including firmware embedded at a device. Hardware processing resources may include processors or controllers, such as an Intel® brand processor, ARM® brand processors, Qualcomm® brand processors, or other processors and chipsets, or other such devices for software executing on hardware capable of operating a relevant environment of the information handling system. In an embodiment, an information handling system 100 may include an integrated circuit or a board-level product having portions thereof that may also be any combination of hardware and software. Devices, hardware resources, or controllers executing software or firmware modules or programs that are in communication with one another need not be in continuous communication with each other, unless expressly specified otherwise. In addition, devices, hardware resources, or controllers executing firmware or software modules or programs that are in communication with one another may communicate directly or indirectly through one or more intermediaries.

Figure 2:
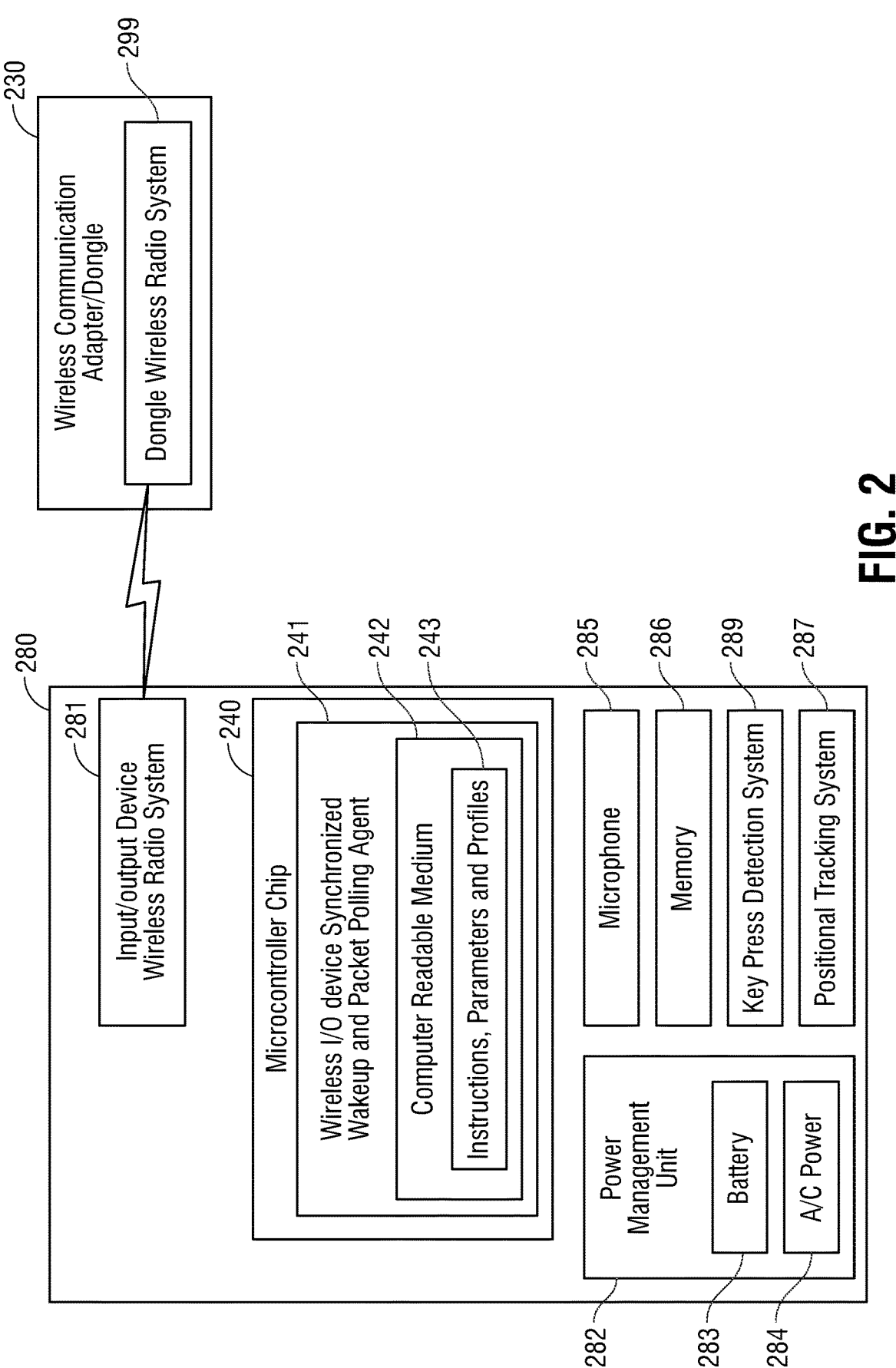
FIG. 2 is a block diagram illustrating a wireless IO device wirelessly paired to a wireless radio adapter or a wireless communication dongle that is operatively coupled to an information handling system according to an embodiment of the present disclosure.

FIG. 2 is a graphical diagram illustrating a wireless communication dongle 230 wirelessly paired to a wireless input/output (IO) device 280 according to an embodiment of the present disclosure. As described previously, the wireless communication dongle 230 may be a dongle device paired to an information handling system or integrated within an information handling system in various embodiments herein. The wireless IO device 280 in various embodiments herein may comprise a mouse, a keyboard, an audio headset, earbuds, gaming controllers, or various peripheral virtual reality devices (e.g., headset or handheld controllers). A power management unit 282 with a battery 283 or A/C power charging adapter 284 may be on the wireless IO device 280 to provide power to the microcontroller chip 240, the speaker 288, the microphone 285, or other components of the wireless IO device 280. In an embodiment, the wireless IO device 280 may include a microcontroller chip 250 that may be any device or devices that execute instructions, parameters, and profiles 243 of a wireless IO device synchronized wakeup and packet polling agent 240 at the wireless IO device 280 to synchronize a wakeup method for the wireless input/output IO devices 280 and the wireless communications dongle 230. As described herein, the wireless communication dongle 230 in an embodiment may include a controller executing code instructions of a wireless IO device synchronized wakeup and packet polling system to perform such a wake synchronization using a limited number of designated wake channels. Such a system may further orchestrate transmission of plural data packets from one or more paired wireless IO devices (e.g., 280) during any data packet communication frame. Such an orchestration may be initiated by transmission from the dongle wireless radio system 299 to the IO device wireless radio system 281 of one or more polling packets to each elicit plural data packets, as described herein. The wireless IO device synchronized wakeup and packet polling agent 241 of the wireless IO device 280 may operate to instruct the IO device wireless radio system 281 to transmit data packets within a synchronized data packet communication frame between the wireless communication dongle 230 and the wireless IO device 280 after receiving a request to connect upon wake of the wireless IO device 380 from a sleep mode. A data packet frame is transmitted in response to a polling packet according to the received polling packets having coordinating instructions as to number of packets, packet lengths, and time slots to be used in the packet frame sent to the wireless dongle.

The IO wireless radio system 281 in an embodiment may be capable of communication between the wireless IO device 280 and the wireless communication dongle 230 using a wireless link established under radio protocols such as Bluetooth® Low Energy (BLE) radio layer protocol (e.g., BLE radio with Gaussian Frequency Shift Keying (GFSK) data modulation) as modified with the wireless IO device communication protocol of embodiments herein, for example. The IO device wireless radio system 281 may provide connectivity of the wireless IO device 280 to the wireless communication dongle 230, external or integrated, and is operatively coupled to the information handling system via one or more wireless links. Such wireless links may be established pursuant to Bluetooth® Low Energy (BLE) radio layer protocol (e.g., BLE radio with Gaussian Frequency Shift Keying (GFSK) data modulation), for example. Such wireless links may be established in an embodiment following an initial pairing between the wireless IO device 280 and the wireless communication dongle 230, which may include various handshake and identification methods under the Bluetooth® Low Energy (BLE) radio layer protocol (e.g., BLE radio with Gaussian Frequency Shift Keying (GFSK) data modulation) as modified with the wireless IO device communication protocol of embodiments herein. During such an initial pairing session, the wireless communication dongle 230 in an embodiment may also transmit to the wireless IO device 280 an assigned radio frequency channel or a few designated wake channels (e.g., designated radiofrequency (RF) wake channels) selected from channels in a wireless Bluetooth® or BLE communications band upon which the wireless IO device 280 is instructed to transmit requests to connect to the wireless communications dongle 230 upon switching from a sleep mode to a waking state. This designated RF wake channel is monitored by a wireless communications dongle 230 and radio 299 when a timeout has been reached with no data communications from the wireless IO device 280.

The IO device wireless radio system 281 may operate in accordance with Bluetooth® Low Energy (BLE) radio layer protocol (e.g., BLE radio with Gaussian Frequency Shift Keying (GFSK) data modulation) as modified with the wireless IO device communication protocol of embodiments herein. To communicate with a wireless personal area network (WPAN), standards including IEEE 802.15 WPAN standards, Service Discovery Protocol (SDP), Radio Frequency Communications (RFCOMM) protocol, Telephony control protocol (TCS), Logical Link Control and Adaptation Protocol (L2CAP), or similar wireless standards may be used, including standards currently managed by the Bluetooth® Special Interest Group (SIG). Utilization of radiofrequency communication bands according to several example embodiments of the present disclosure may include bands used with the WPAN standards which may use frequency bands such as those within the 2.400 to 2.4835 GHZ Industrial, Scientific, and Medical (ISM) band having plural channels therein. In some embodiments herein, the IO device wireless radio system 281 of the wireless IO device 280 may be shut down during a sleep mode which may assist in saving battery power according to embodiments herein. The IO device wireless radio system 281 may then be turned on upon a wake event at the wireless IO device 280 to transmit a request to connect on a designated wake channel in embodiments herein.

The present disclosure contemplates a computer-readable medium 242 that includes instructions, parameters, and profiles 243 or receives and executes instructions, parameters, and profiles 243 responsive to a propagated signal, so that the IO device wireless radio system 281 may communicate voice, video or data to the wireless communication dongle 230, integrated or operatively coupled to the information handling system. In an embodiment in which the wireless IO device 280 comprises a mouse, the wireless IO device 280 may further include a position tracking system 287 capable of recording or tracking changes in position of the mouse with respect to the wireless communication dongle 230, as provided as input by the user of an information handling system. Such positional tracking system 287 may also determine a correlated position change for a cursor or visual graphical representation (e.g., game character, weapon, or camera view) within a software application executing on the information handling system operably connected to the wireless communication dongle 230. This positional information for the mouse or correlated changes to cursors or other graphical representations at the information handling system may be transmitted as data packets to the dongle wireless radio system 299 as described herein. In some embodiments, when a wireless IO device such as a wireless mouse, wireless gaming controller or an augmented or virtual reality system, is in a sleep mode and receives input from positional tracking system 287 or in connection with a motion sensor or proximity sensor, this may trigger a wake event at the wireless IO device.

In another embodiment in which the wireless IO device 280 comprises a keyboard, the wireless IO device 280 may further include a key press detection system 289 that identifies specific keys pressed by a user. Such key press data may be transmitted as data packets to the dongle wireless radio system 299 as described herein. In some embodiments, when a wireless IO device such as a wireless mouse, keyboard or other device, is in a sleep mode and receives input from keypress detection system 289 or in connection with a motion sensor or proximity sensor, this may trigger a wake event at the wireless IO device.

In yet another embodiment in which the wireless IO device 280 comprises a headset or earbuds, for example, the wireless IO device 280 may further include a microphone 285 for recording of audio user input. Such audio user input in an embodiment may be transmitted as data packets to the dongle wireless radio system 299 as described herein. In some embodiments, when a wireless IO device such as the headset or earbuds or other device, is in a sleep mode and receives input from microphone 285 or in connection with a motion sensor or proximity sensor, this may trigger a wake event at the wireless IO device.

Instructions 243 of the wireless IO device synchronized wakeup and packet polling agent 241 may be executed by the microcontroller chip 240, for example a controller integrated circuit, to transmit such data packets to the wireless communication dongle 230 at an information handling system pursuant to polling packets generated at the wireless IO device synchronized wakeup and packet polling system operating at the wireless communication dongle 230 and transmitted to the wireless IO device 280. Such instructions 243 of the wireless IO device synchronized wakeup and packet polling agent 241 may include instructions for instructing transmission of data packets by the IO device wireless radio system 281 of an allotted data packet number, having an allotted data packet length, at allotted data packet transmission time slots, as identified within polling packets received at the wireless IO device 280 from the wireless communication dongle 230. Identifying information for the wireless IO device 280 may be stored in memory 286 in an embodiment. Such identifying information in an embodiment may operate to identify the wireless IO device 280 as a device authorized to transceive data with the dongle 230, as well as information sufficient to identify the wireless IO device 280, such as a Media Access Control (MAC) address, IP address, or model number.

The wireless IO device 280 may, in some embodiments include a processing resource such as a microcontroller 240. Any of the processing resources described herein may be used and may operate to execute code that is either firmware or software code. Instructions 243 may include a wireless IO device synchronized wakeup and packet polling agent 241 or other software applications or drivers detectable by the microcontroller 240 or other processing resource. The instructions 243 in an embodiment may reside completely, or at least partially, within the memory 286.

The wireless IO device 280 may include a set of instructions 243 that may be executed to cause the computer system such as the wireless IO device 280 to perform any one or more of the methods or computer-based functions disclosed herein. For example, instructions 243 may include a particular example of a wireless IO device synchronized wakeup and packet polling agent 241, or other aspects or components. The wireless IO device synchronized wakeup and packet polling agent 241 on the wireless IO device 280 may utilize a computer-readable medium 242 in which one or more sets of instructions 243 such as firmware executed with microcontroller chip 240, for example a controller integrated circuit with embedded firmware in an example embodiment. In other embodiments, the wireless IO device synchronized wakeup and packet polling agent 241 may operate in part as software or firmware instructions executed on the wireless IO device 280. The instructions 243 may embody one or more of the methods as described herein. For example, instructions relating to the wireless IO device synchronized wakeup and packet polling agent 241, firmware or software algorithms, processes, and/or methods may be stored here.

Memory 286 may contain computer-readable medium (not shown), such as RAM in an example embodiment. An example of memory 286 includes random access memory (RAM) such as static RAM (SRAM), dynamic RAM (DRAM), non-volatile RAM (NV-RAM), or the like, read only memory (ROM), another type of memory, or a combination thereof. Memory 286 may also comprise static memory containing computer-readable medium (not shown), such as NOR or NAND flash memory in some example embodiments. The instructions, parameters, and profiles 243 of the wireless IO device synchronized wakeup and packet polling agent 241 may be stored in memory 286 on a computer-readable medium 242 such as a flash memory or magnetic disk in an example embodiment.

Figure 3:
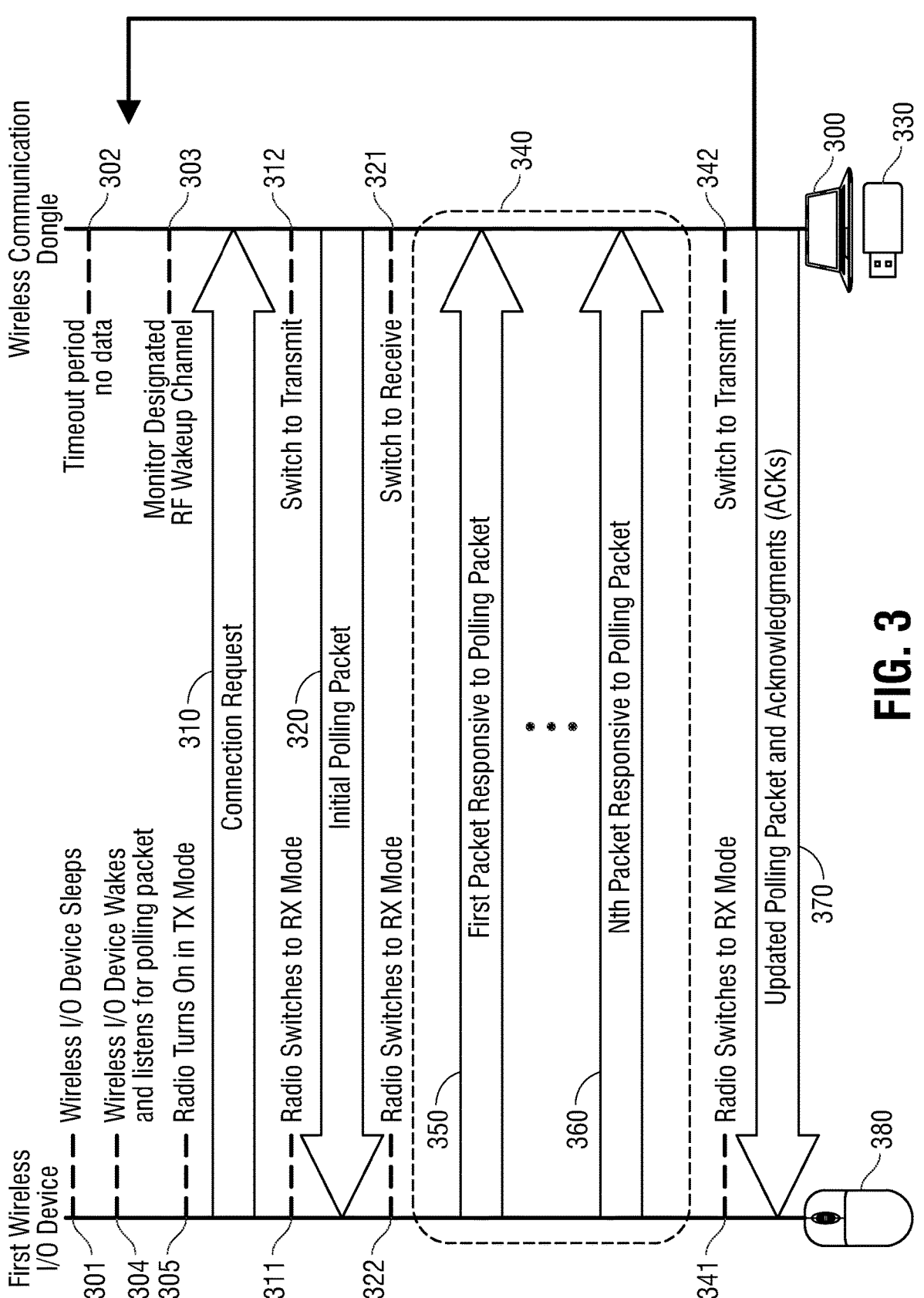
FIG. 3 is a block diagram illustrating a wake event and a data packet communication frame orchestrated by the wireless IO device synchronized wakeup and packet polling system according to an embodiment of the present disclosure.

FIG. 3 is a block diagram illustrating a data packet communication frame between a wireless communications dongle or integrated wireless radio system and a paired wireless input/output (IO) device orchestrated by a controller of the wireless communications dongle or integrated wireless radio system executing code instructions of the wireless IO device synchronized wakeup and packet polling system according to an embodiment of the present disclosure. A controller of a wireless communications dongle 330 or a wireless radio system of an information handling system

300 in an embodiment may coordinate a wake event and establishing wireless data packet communications between a wireless dongle 330 or integrated wireless adapter of an information handling system 300 via a designated wake channel monitored by the wireless communications dongle 330 or wireless adapter for a request to connect signal from one or more paired wireless IO devices (e.g., mouse 380) Further, the controller of the wireless communications dongle 330 or a wireless radio system of an information handling system 300 in an embodiment may schedule receipt of a plurality of data packets from one or more paired wireless IO devices (e.g., mouse 380) between delivery of polling packets and data packets that include an acknowledgement header (ACK) to each of those one or more paired wireless IO devices (e.g., mouse 380). For ease of explanation, the wireless IO device synchronized wakeup and packet polling system in various embodiments herein may be described as executing at the wireless communications dongle 330 in some embodiments herein. However, it is also contemplated that the wireless IO device synchronized wakeup and packet polling system may operate internally within an integrated wireless radio system of the information handling system 300 in an embodiment. In other embodiments, the wireless communication dongle 330 or integrated wireless radio system is capable of establishing wireless links with the wireless IO device 380 according to the Bluetooth® Low Energy (BLE) radio layer protocol (e.g., BLE radio with Gaussian Frequency Shift Keying (GFSK) data modulation).

As described herein, a controller for a wireless radio system of a wireless communication dongle 330 or an information handling system 300 may execute code instructions of the wireless IO device synchronized wakeup and packet polling system to place the wireless communications dongle 330 or wireless radio system of the information handling system 300 in a listening or RX mode upon detection that a timeout period, either a timer or a period of one or more packet data frames not received from a wireless IO device 380. The listening or RX mode consumes less power and avoids congestion of periodic polling from the wireless communication dongle 330 or integrated wireless radio adapter when it has been determined that the wireless IO device 380 is no longer transmitting data packets, such as when it has entered a sleep mode. In such a case, the controller may execute code instructions of the wireless IO device synchronized wakeup and packet polling system to place the wireless communication dongle 330 or wireless radio system of the information handling system 300 in a low-power receive (RX) mode to monitor a previously designated wake channel or wake channels for a request to connect upon a wake event at the wireless IO device. In other words, when the wireless communication dongle 330 or wireless radio system of the information handling system 300 stops receiving data packets from the wireless IO device 380, the controller may determine, after a timeout period or number of polling packets (e.g., 370) that the wireless IO device 380 has entered a sleep or low power mode. The wireless IO device 380 may then turn off its radio to conserve battery power but have stored the designated wake channel or channels on which to send a request to connect (e.g., 310) upon next wakeup cycle with a wake event. In order to conserve energy, the controller at the wireless communication dongle 330 or wireless radio system of the information handling system 300 may set the radio to a listen or RX mode to await the wireless IO device 380 waking up and initiating a new communication request 310 on one or of the limited number of designated wake channels with the wireless communications dongle 330 or wireless radio system of information handling system 300.

For example, as shown in FIG. 3, the wireless IO device 380 may initially be in a sleep state 301 in which its radio is turned off. After a timeout period 302 with a number of polling packets without a packet data response or a timer expiring without response, the wireless communication dongle 330 or wireless radio system of information handling system 300 may be set to a listen/RX mode at 303 in which it receives transmissions on the designated one or more radiofrequency (RF) wake channels known to the wireless IO device 380. The designated RF wake channel(s) in an embodiment may include any RF channel within the Bluetooth® Low Energy (BLE) radio layer protocol (e.g., BLE radio with Gaussian Frequency Shift Keying (GFSK) data modulation) and in accordance with the wireless IO device communication protocol of embodiments herein, for example. The wireless IO device 380 in an embodiment may wake upon a wake event 304 by receiving some form of user input, such as a mouse undergoing movement, or a keyboard recognizing a keystroke, in some embodiments for example. Upon waking in response to such a received or detected user input as wake event 304, the wireless IO device 380 may turn on its wireless radio system to listen for a polling packet from the wireless communication dongle 330 or wireless adapter of information handling system 300.

In some cases, the wireless communications dongle 330 or the wireless radio system of the information handling system 300 in an embodiment may already be engaged in transceiving of data packets with a second wireless IO device (not shown) while the wireless IO device 380 was in a sleep state. In such a case, while the wireless IO device 380 remains in such a sleep state, the controller may place the wireless radio system of the wireless communications dongle 330 or information handling system 300 into RX mode or TX mode in accordance with transmitting polling packets or receiving data packet communication frames from the second wireless IO device (not shown). In order to avoid any chance of collision between data packets transceived from such a second wireless IO device (not shown) or the polling packet and transmission of the connection request 310 from the wireless IO device 380 upon waking from a sleep mode, the wireless device 380 may initially enter a receive/listen mode upon waking. In such an embodiment, immediately upon waking, the wireless IO device 380 may initiate a polling packet listening timer (e.g., one second, 500 microseconds, 250 microseconds) in which the wireless IO device 380 listens to the radio frequency channel specifically assigned to the wireless IO device 380 for polling packets, or transceiving of data packets with the wireless communications dongle 330 or information handling system 300.

In an embodiment in which the wireless communications dongle 330 or information handling system 300 is not currently awake or is in low power mode (e.g., in listening mode and awaiting receipt of a new connection request 310), the wireless IO device 380 may not receive a polling packet (e.g., 320) transmitted from the wireless communications dongle 330 or the information handling system 300 prior to running of the polling packet listening timer. In such a case, upon the polling packet listening timer elapsing, the wireless IO device 380 may transmit a new connection request 310 to the wireless communications dongle 330 or the information handling system 300 wake the wireless communications dongle 330 or radio adapter and prompt orchestration of a new data packet communication frame 340 via a polling packet 320.

In an embodiment in which the wireless communications dongle 330 or information handling system 300 is currently awake and engaged in communication with a second wireless IO device (not shown), the wireless IO device 380 may receive a polling packet (e.g., at 304) transmitted from the wireless communications dongle 330 or the information handling system 300 to the second wireless IO device (not shown). Such a polling packet may provide data on a number of packets the other wireless IO device will transmit and this is used to determine when the second wireless IO device 380 may transmit a new connection request 310 in a reserved provisional timeslot after the last data packet from the other wireless IO device. In such an embodiment, the wireless IO device 380 may transmit a new connection request 310 within an previous data packet communication frame (not shown, but prior to 340) initiated by the polling packet received at 304. The wireless IO device 380 waits for a reserved provisional timeslot to transmit the new connection request to join following the final packet transmitted by the second wireless IO device in a data packet communication frame responsive to the received polling packet detected at 304. This will trigger a second polling packet 320 with instructions for transmitting a selected number of data packets as part of a next data packet polling frame 340 including data packets 350 to 360 in addition to any data packets transmitted at other timeslots in the same data packet communication frame 340 by the other wireless IO device previously communicating with the wireless communication dongle 330 or information handling system 300. This allows for low energy joinder of the wireless IO device 380 via the wireless IO device communication protocol of embodiments herein with limited additional latency due to the short duration of the reserved, provisional timeslot in the data packet communication frames. A savings of transmission, acknowledgement, and airtime usage with such a joinder may be realized.

In an embodiment in which the wireless communications dongle 330 or information handling system 300 is not currently awake or is in low power mode, as determined based on lack of receipt of a polling packet until a polling packet timer has elapsed, the controller of the first wireless IO device 380 may place the wireless radio system in transmit (TX) mode at 305. The wireless IO device 380 may then transmit a new connection request 310 to the wireless communication dongle 330 or wireless radio system of the information handling system 300 on the designated RF wake channel(s) to which the wireless communication dongle 330 or wireless radio system of the information handling system 300 is currently listening as shown in FIG. 3. By listening to only the one or small group of designated RF wake channels during sleep mode, rather than scanning a plurality of all channels available within the Bluetooth® Low Energy (BLE) radio layer protocol (e.g., BLE radio with Gaussian Frequency Shift Keying (GFSK) data modulation) as modified by the wireless IO device communication protocol of embodiments herein, the wireless radio system of the wireless communication dongle 330 or information handling system 300 may conserve power.

The connection request 310 in some embodiments may include an identification of the model number or various default communication metrics for the mouse 380 or other identifying information for the mouse 380 or other IO devices that the wireless communications dongle 330 or the information handling system 300 may use to access stored information identifying such default communications metrics. For example, the connection request 310 may include a standard data packet transmission rate (e.g., 80 Kilobits per second (Kbps)), or standard data packet transmission length (e.g., 23 bytes or 184 bits) for the mouse 380 or other IO devices. As another example, the connection request 310 may include identification for the mouse 380 or other IO devices that is associated with a profile stored at the wireless communications dongle 330 or the information handling system 300 providing such standard data packet transmission rate or standard data packet transmission length.

After the wireless IO device 380 transmits the connection request 310, the wireless radio system for the wireless IO device 380 may switch to a RX mode at 311. Upon receipt of the connection request 310 at the wireless radio system for the wireless communication dongle 330 or information handling system 300, the wireless communications dongle 330 or wireless radio system of the information handling system 300 may switch to a TX mode at 312 and transmit a polling packet 320 for a new data packet communication frame 340. The controller of the wireless communications dongle 330 or the information handling system 300 integrated wireless radio system executing code instructions of the wireless IO device synchronized wakeup and packet polling system in an embodiment may generate an initial polling packet 320 that instructs each of the wireless IO devices (e.g., 380) paired with the wireless communications dongle 330 or the information handling system 300 to transmit a plurality of data packets of a specified length and at specified time slots during a first data packet communication frame between the wireless communications dongle 330 or the information handling system 300 and each of the paired wireless IO devices (e.g., 380). The controller of the wireless communications dongle 330 or the information handling system 300 executing code instructions of the wireless IO device synchronized wakeup and packet polling system in an embodiment may determine an initial wireless IO device frame data packet number, initial wireless IO device frame data packet length, or initial allotted data packet transmission time slots for receipt of data packets transmitted from the wireless IO device 380 based on default initial values that apply to the paired wireless IO device or to a wireless IO device 380 identifiable based on information given within the request to connect. For example, the controller of the wireless communications dongle 330 or the information handling system 300 executing code instructions of the wireless IO device synchronized wakeup and packet polling system may determine an initial wireless IO device frame data packet number of five, initial wireless IO device frame data packet length of 23 bytes (B), or initial allotted data packet transmission time slots occurring every 0.000167 seconds (167 µs) for receipt of data packets transmitted from the wireless IO device 380 within a data packet communication frame having a total length of 0.000833 seconds plus any delay or gap times included, or about 1,000 µs.

The controller of the wireless communications dongle 330 or the information handling system 300 may instruct the wireless radio system to transmit an initial polling packet 320 containing the initial wireless IO device frame data packet number, the initial wireless IO device frame data packet length, and initial allotted data packet transmission time slots. This initial polling packet 320 in an embodiment may synchronize communication between the wireless communications dongle 330 or the information handling system 300 and the wireless IO device 380 for a data packet communication frame beginning at a specified time and having the specified duration (e.g., 0.000833 seconds). Upon transmission of the initial polling packet 320 in an embodiment, the controller for the wireless communications dongle

330 or the information handling system 300 may switch the wireless radio system at the wireless communication dongle or wireless adapter of the information handling system into a receive mode at 321 to await the beginning of the data packet communication frame with the wireless IO device 380. At this point, the wireless IO device 380 may switch its radio system to a TX mode at 322, following receipt of the initial polling packet 320.

At the time specified within the initial polling packet 320 in an embodiment, the data packet communication frame 340 may begin with transmission of a first packet 350 and plural other packets up to an Nth packet 360 responsive to the initial polling packet 320 from the wireless IO device 380, and receipt of those packets 350-360 at the wireless radio system of the wireless communication dongle 330 or information handling system 300. In an embodiment, the first packet 350 for the data packet communication frame 340 may adhere to the instructions received within the initial polling packet 320. For example, in an embodiment, the first packet 350 may have a length equivalent to the initial wireless IO device frame data packet length of 23 Bytes and may be delivered at the synchronized time designating the beginning of the data packet communication frame 340 within the first of N=five initial allotted data packet transmission time slots, as defined within the initial polling packet 320. It is appreciated that any packet length and number of packets may be set by the initial polling packet 320 and its instructions of packet number, frame length or other data packet frame requirements.

A microcontroller executing code instructions of the wireless IO device synchronized wakeup and packet polling system at the wireless communications dongle 330 or the information handling system 300 may ensure that, during this data packet communication frame 340, the wireless radio system remains in a receive mode to receive data packets from the one or more paired wireless IO devices (e.g., 380) during the anticipated duration of the data packet communication frame 340. In other words, the controller of the wireless communications dongle 330 or the information handling system 300 may avoid any power loss, data rate transmission delay, or use of airtime causing band congestion due to rapid switching between RX/TX modes during this data packet communication frame 340. During the data packet communication frame 340 in an embodiment, the wireless radio system of the wireless IO device 380 may transmit and the wireless radio system of the wireless communication dongle 330 or the information handling system 300 may receive a plurality of data packets 350-360 equivalent to the initial wireless IO device frame data packet number as defined within the initial polling packet 320. For example, in an embodiment in which the initial polling packet 320 identified an initial wireless IO device frame data packet number of five, the Nth packet 360 received by the wireless radio system of the wireless communication dongle 330 or the information handling system 300 may be the fifth of five data packets transmitted during the data packet communication frame 340 from the wireless IO device 380 to the wireless communication dongle 330 or the information handling system 300. Each of the five data packets transmitted to the wireless communication dongle 330 or the information handling system 300 by the wireless IO device 380 in an embodiment may have the initial wireless IO device frame data packet number and initial wireless IO device frame data packet length and may be transmitted at the designated initial allotted data packet transmission time slots identified within the initial polling packet 320. At the end of the data packet communication frame 340, the wireless radio system of the wireless IO device may be switched to a RX mode at 341.

Following the data packet communication frame 340, the controller of the wireless communications dongle 330 or the information handling system 300 may switch the wireless radio system to a transmit mode at 342 for further synchronizing future data packet communication frames and also acknowledging receipt or missed packets from a previous data packet communication frame. The controller may execute code instructions of the wireless IO device synchronized wakeup and packet polling system in an embodiment to generate and transmit an updated polling packet 370. In an embodiment, such an updated polling packet 370 may include an acknowledgement header (ACK) identifying the number (N) of packets received during the data packet communication frame 340. For example, in an embodiment in which the Nth packet 360 is the fifth of five packets allotted to the wireless IO device 380 for transmission within the data packet communication frame 340 within the initial polling packet 320, such an updated polling packet 370 may acknowledge receipt of five packets.

The updated polling packet 370 in an embodiment may further include updated instructions for synchronizing transmission of data packets within a second, later data packet communication frame. For example, the updated polling packet 370 may, at the very least, provide acknowledgement of received data and an updated time for initiation of such a second, later data packet communication frame. In such an embodiment, the updated polling packet 370 may or may not further adjust one or more of the wireless IO device frame data packet number, wireless IO device frame data packet length, or allotted data packet transmission time slots for the wireless IO device 380. For example, in an embodiment, the updated polling packet 370 identifying an updated time for initiation of a second, later data packet communication frame may also provide an updated allotted data packet number equivalent to the initial wireless IO device frame data packet number. In another example, in an embodiment, the updated polling packet 370 may also provide an updated wireless IO device frame data packet length equivalent to the initial wireless IO device frame data packet length. In still another example, in an embodiment, the updated polling packet 370 may also provide updated wireless IO device frame data packet time slots having the same positions within the second data packet communication frame as the positions of the initial allotted data packet transmission time slots within the first data packet communication frame 340. In other embodiments, one or more of these values for the updated wireless IO device frame data packet number, updated wireless IO device frame data packet length, or updated allotted data packet transmission time slots may be changed or adjusted from the values of the initial wireless IO device frame data packet number, initial wireless IO device frame data packet length, or initial allotted data packet transmission time slots given within the initial polling packet 320 by the wireless IO device (e.g., 380).

In a further aspect of an embodiment, the controller of the wireless communication dongle 330 or the information handling system 300 executing code instructions of the wireless IO device synchronized wakeup and packet polling system in an embodiment may determine that the wireless IO device 380 has failed to transmit any data packets equivalent to the initial wireless IO device frame data packet number within the initial polling packet 320. This may occur, for example, if the wireless IO device 380 powers down or enters sleep mode during the data packet communication frame 340 from lack of use. More specifically, the wireless IO device 380 may remain idle (e.g., not detecting movement by a user in the case of a mouse, or detecting no input in the form of keystrokes or detected sound from keyboards or headsets). If the wireless IO device 380 remains idle for a sufficiently long period of time, the wireless IO device 380 may enter a sleep state where it ceases transmission of information in the form of any data packets in a data packet frame to the wireless communications dongle 330 or the information handling system 300. This may occur following transmission of the Nth packet 360, and either prior to or after transmission of the updated polling packet 370 by the wireless radio system of the wireless communication dongle 330 or information handling system 300 to the wireless IO device 380.

In order to detect such a scenario in which the wireless IO device 380 has entered a sleep mode 301, the controller of the wireless communication dongle 330 or the information handling system 300 executing code instructions of the wireless IO device synchronized wakeup and packet polling system in an embodiment may initiate a device responsiveness timer having a preset duration (e.g., two minutes, five minutes, ten minutes) or a counter of polling packets 320 sent without response. This timer or counter may begin to run upon transmission of the most recent updated polling packet 370 by the wireless radio system of the wireless communication dongle 330 or information handling system 300. If no further data packets are received from the wireless IO device 380 before the device responsiveness timer expires or counter reaches a threshold count, this may indicate that the wireless IO device 380 has been powered down or entered a sleep mode.

In one particular example embodiment, the controller for the wireless communication dongle 330 or wireless radio system of information handling system 300 executing code instructions of the wireless IO device synchronized wakeup and packet polling system may transmit a later updated polling packet (not shown), following the last time slot allotted to the wireless IO device 380 within the updated polling packet 370 in a later data packet frame similar to 340 (e.g., indicating no receipt of any data packets during the data packet communication frame following the updated polling packet 370). One or more of such updated polling packets indicating failure to receive any data packets from the wireless IO device 380 in a data packet frame may be up to a threshold number (e.g., one, three, five, ten, etc.), at which time it may be assumed that the wireless IO device 380 has entered a sleep state 301. In such a case, the controller of the wireless communication dongle 330 or the information handling system 300 executing code instructions of the wireless IO device synchronized wakeup and packet polling system in an embodiment may return to the RX mode 303 to monitor or listen to the designated RF wake channels for a new connection request (e.g., 310) from the wireless IO device 380 upon a wake event (e.g., 304) of the wireless IO device 380.

Figure 4:
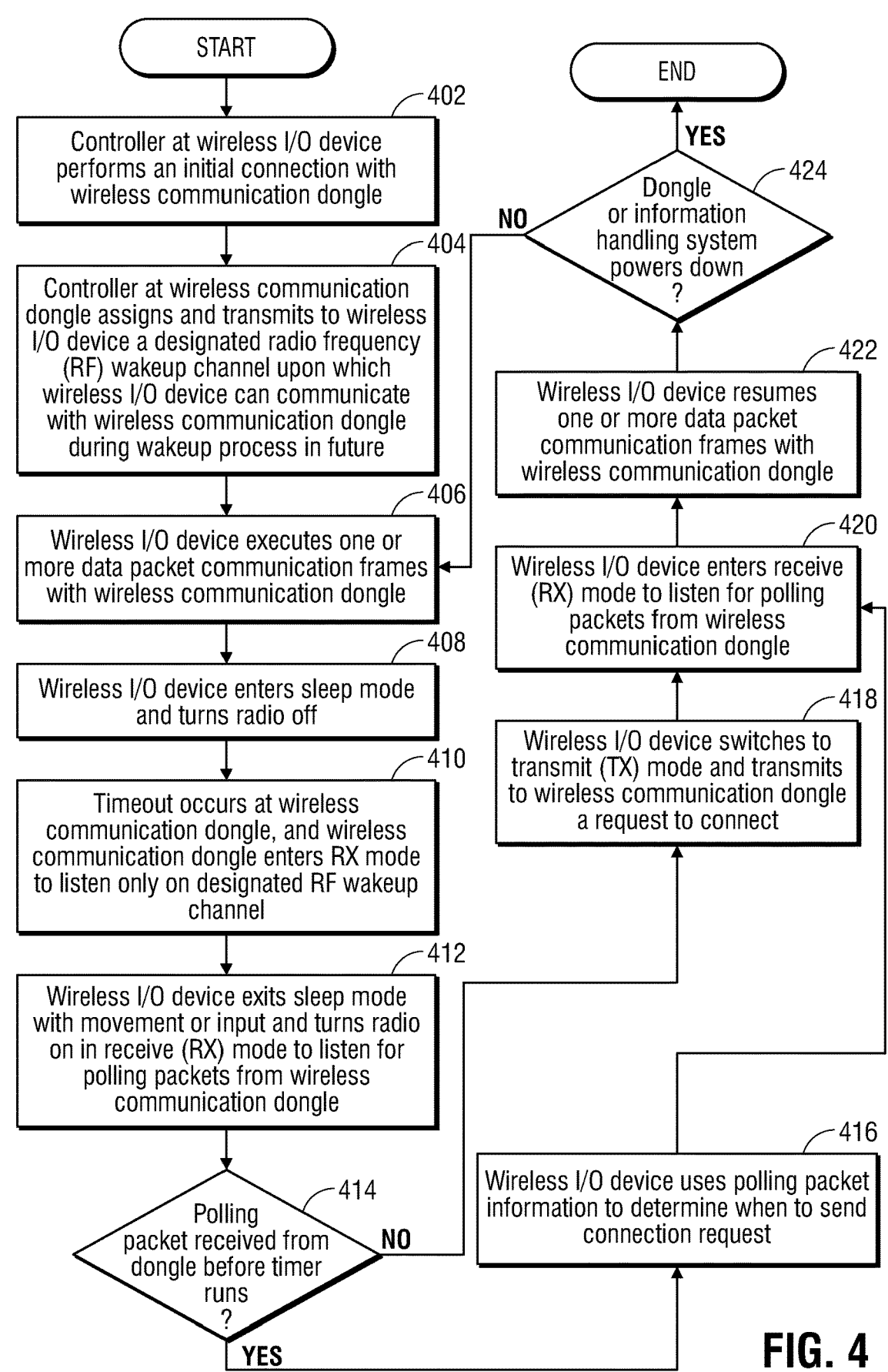
FIG. 4 is a flow diagram illustrating a method of a wireless IO device initiating a wake method to switch a paired wireless IO device and a wireless communication dongle from a sleep state to a wake state according to an embodiment of the present disclosure.

FIG. 4 is a flow diagram illustrating a method of a wireless input/output (IO) device initiating a wake method to provide for a wake event at an operatively coupled wireless IO device to switch a paired wireless communication dongle from a sleep or low power state in which the wireless communication dongle is in a receive (RX) mode monitoring for request to connect data from the wireless IO device on a designated wake channel or channels according to an embodiment of the present disclosure. The wireless communication dongle or wireless adapter of an information handling system may transition from a low power RX mode monitoring wake channel to a wake state in which the wireless communication dongle is in a transmit (TX) mode to restart sending polling packets to the wireless IO device according to some embodiments of the present disclosure.

As described herein, a controller of a wireless communications dongle or wireless radio system for an information handling system may execute code instructions of the wireless IO device synchronized wakeup and packet polling system in an embodiment to place the wireless communications dongle or wireless radio system of an information handling system in a listening or RX mode when it has been determined that the wireless IO device is no longer transmitting data packets, or has entered a sleep mode. In other words, when the wireless communication dongle or wireless radio system stops receiving data packets from the wireless IO device, the controller may assume the wireless IO device has entered a sleep or low power mode. The wireless IO device may save battery power by shutting down its radio in an embodiment. In order to conserve energy and limit communication band congestion, the controller at the wireless communication dongle or wireless radio system may be set to a RX mode to listen on a designated Radio Frequency (RF) wake channel(s) to await the wireless IO device wake event and initiation of a new communication with the wireless communications dongle or wireless radio system on this designated wake channel(s). Upon waking, the wireless IO device in embodiments of the present disclosure may transmit a new connection request, prompting the wireless communications dongle or wireless radio system to switch to a TX mode and transmit a polling packet with instructions for a new data packet communication frame.

At block 402, a controller of a wireless IO device may perform an initial pairing between the wireless IO device and the wireless communications dongle. For example, in an embodiment described with reference to FIG. 2, the wireless radio system 281 may perform an initial pairing between the wireless IO device 280 and the wireless communication dongle 230, which may include various handshake and identification and authentication methods under the Bluetooth® Low Energy (BLE) radio layer protocol (e.g., BLE radio with Gaussian Frequency Shift Keying (GFSK) data modulation) as modified by the wireless IO device communication protocol of embodiments herein.

The controller at the wireless communications dongle in an embodiment may execute code instructions of the wireless IO device synchronized wakeup and packet polling system to assign and transmit to the wireless IO device one or a few RF wake channels upon which the wireless IO device can communicate with the wireless communications dongle during a future wakeup process at block 404. For example, during the initial pairing session described above with respect to block 402, the wireless communication dongle 230 in an embodiment may also transmit to the wireless IO device 280 one or a limited number of designated RF wake channels upon which the wireless IO device 280 is instructed to transmit requests to connect to the wireless communications dongle 230 upon switching from a sleep mode to a waking state.

At block 406, the wireless IO device in an embodiment may execute one or more data packet communication frames with the wireless communication dongle. For example, in an embodiment described with respect to FIG. 3, the wireless IO device 380 may execute one or more data packet communication frames (e.g., 340) in response to a polling packet with packet data frame instructions received from the wireless communication dongle 330 or wireless adapter of information handling system 300, as also described in greater detail below with respect to FIG. 5.

The wireless IO device in an embodiment at block 408 may enter a sleep mode. For example, the wireless IO device 380 may remain idle (e.g., not detecting movement by a user in the case of a mouse for example, or detecting no input in the form of keystrokes or detected sound from keyboards or headsets for example). If the wireless IO device 380 remains idle for a sufficiently long period of time, the wireless IO device 380 may enter a sleep state where it ceases transmission of information in the form of data packets to the wireless communications dongle 330 or the information handling system 300. While in this sleep mode, the wireless IO device 380 may turn off its wireless radio system to conserve power.

At block 410, the wireless communication dongle may detect that a timeout has occurred and enter a low-power RX mode to listen only on the designated RF wake channel or limited number of wake channels for a new connection request from the wireless IO device. For example, in order to detect when the wireless IO device 380 has entered a sleep mode, the controller of the wireless communication dongle 330 or the information handling system 300 executing code instructions of the wireless IO device synchronized wakeup and packet polling system in an embodiment may initiate a device responsiveness timer having a preset duration (e.g., two minutes, five minutes, ten minutes). This timer may begin to run upon transmission of the updated polling packet 370 by the wireless radio system of the wireless communication dongle 330 or information handling system 300. If no further data packets are received from the wireless IO device 380 before the device responsiveness timer expires, this may indicate that the wireless IO device 380 has been powered down or entered a sleep mode. In another example embodiment, the controller for the wireless communication dongle 330 or wireless radio system of information handling system 300 executing code instructions of the wireless IO device synchronized wakeup and packet polling system may monitor a count of transmitted polling packets with no data in response from the wireless IO device 380. For example, if a later updated polling packet (not shown) is transmitted following the last time slot allotted to the wireless IO device 380 within the updated polling packet 370 (e.g., indicating no receipt of any data packets during the data packet communication frame following the updated polling packet 370), this may trigger a polling packet count to determine a threshold number of polling packets have been sent without responsive data packets in a data packet frame. One or more of such updated polling packets indicating failure to receive any data packets from the wireless IO device 380 may be transmitted by the wireless radio system of the wireless communications dongle 330 or information handling system 300, up to a threshold number (e.g., one, three, five, ten, etc.), at which time it may be assumed that the wireless IO device 380 has entered a sleep state. In such a case, the controller of the wireless communication dongle 330 or the information handling system 300 executing code instructions of the wireless IO device synchronized wakeup and packet polling system in an embodiment may return to the RX mode to listen to the designated RF wake channels for a new connection request (e.g., 310) from the wireless IO device 380 upon waking of the wireless IO device 380.

The wireless IO device in an embodiment may exit sleep mode with a wake event such as movement or input and turn on its wireless radio system in receive (RX) mode at block 412. For example, the wireless IO device 380 in an embodiment of FIG. 3 may wake upon receiving some form of user input as a wake event, such as a mouse undergoing movement, or a keyboard recognizing a keystroke, for example.

Upon waking in response to such a received or detected user input, the wireless IO device 380 may turn on its wireless radio system to listen for a polling packet from the wireless communication dongle. In some cases, the wireless communications dongle 330 or the wireless radio system of the information handling system 300 in an embodiment may already be engaged in transceiving of data packets with a second wireless IO device (not shown) while the wireless IO device 380 remains in a sleep state. In order to avoid any chance of collision between data packets transceived from such a second wireless IO device (not shown) and transmission of the connection request 310 from the wireless IO device 380 upon waking of the wireless IO device 380, the wireless device 380 may initially enter a receive/listen mode at 304 upon waking to listen for a polling packet from the wireless communication dongle 330 or information handling system 300. Such a polling packet may be transmitted from the wireless communication dongle 330 or the information handling system 300 in order to allow for transceiving of data with such a second wireless IO device.

At block 414, the controller for the wireless IO device may determine whether a polling packet has been received from the wireless communication dongle before a polling packet listening timer runs. For example, immediately upon waking at 304, the wireless IO device 380 may initiate a polling packet listening timer (e.g., one second, 500 microseconds, 250 microseconds) in which the wireless IO device 380 listens to the radio frequency channel specifically assigned to the wireless IO device 380 for transceiving of information with the wireless communications dongle 330 or information handling system 300. If the wireless communications dongle 330 or information handling system 300 is currently awake and transceiving data with a second wireless IO device (not shown), the first wireless IO device 380 may receive a polling packet instructing transmission of data packets from such a second wireless IO device (not shown) to the wireless communication dongle 330 or information handling system 300. If such a polling packet is received from the wireless communication dongle before the polling packet listening timer runs, this may indicate that the wireless communication dongle does not need to be woken as it is currently transceiving data with another wireless IO device, and the method may proceed to block 416 for determination as to when the first wireless IO device should transmit the request to connect to the wireless communication dongle in a reserved provisional timeslot. If such a polling packet is not received from the wireless communication dongle before the polling packet listening timer runs, this may indicate that the wireless communication dongle is currently in a low-power RX mode and awaiting receipt of a request to connect from one or more wireless IO devices and the wireless IO device 380 may proceed to block 418 to transmit a request to connect on the wake channel to wake the wireless communication dongle 330.

In an embodiment in which a polling packet is received at the first wireless IO device prior to the polling packet listening timer running, the controller at the first wireless IO device at block 416 may use the polling packet information to determine when to send a request to connect to the wireless communication dongle. For example, in an embodiment in which the wireless communications dongle 330 or information handling system 300 is currently awake and engaged in communication with a second wireless IO device (not shown), the wireless IO device 380 may receive a first polling packet (e.g., at 304 while listening) that is transmitted from the wireless communications dongle 330 or the information handling system 300 to the second wireless IO device (not shown). Such a polling packet may provide a specified number of data packets from the second wireless IO device that is used to determine when the second wireless IO device 380 may transmit a new connection request 310 at a reserved provisional timeslot during a reserved short span of time at the end of the data packet communication frame after the last data packet from the second wireless IO device. In such an embodiment, the wireless IO device 380 may transmit a new connection request 310 within this data packet communication frame initiated by the polling packet received at 304 at the reserved provisional timeslot following the final packet transmitted by the second wireless IO device responsive to the polling packet detected at 304. The flow may then proceed to block 420 to enter a receive (RX) mode after the request to connect has been transmitted to await the next polling packet.

At block 418, the controller for the wireless IO device in an embodiment in which no polling packet was received prior to the polling packet listening timer running may switch to a transmit (TX) mode and transmit to the wireless communication dongle a request to connect on a wake channel to wake the wireless communication dongle. For example, in an embodiment in which the wireless communications dongle 330 or information handling system 300 is not currently awake or is in low power mode (e.g., in listening mode and awaiting receipt of a new connection request 310 on a designated wake channel), the wireless IO device 380 may not receive a polling packet (e.g., 320) transmitted from the wireless communications dongle 330 or the information handling system 300 prior to running of the polling packet listening timer. In such a case, upon the polling packet listening timer elapsing, the wireless IO device 380 may switch to a transmit (TX) mode and transmit to the wireless communication dongle a request to connect in an embodiment. For example, the wireless IO device 380 may place its wireless radio system in transmit (TX) mode and transmit a new connection request 310 to the wireless communication dongle 330 or wireless radio system of the information handling system 300 on the designated RF wake channel(s) described at block 404, above. By listening to only the one or small group of designated RF wake channels during sleep mode, rather than scanning a plurality of all channels available within the Bluetooth® Low Energy (BLE) radio layer protocol (e.g., BLE radio with Gaussian Frequency Shift Keying (GFSK) data modulation) according to the wireless IO device communication protocol of embodiments herein, the wireless radio system of the wireless communication dongle 330 or information handling system 300 may conserve power.

At block 420, the wireless IO device radio system may switch to RX mode to listen for a polling packet from the wireless communication dongle in an embodiment after transmitting a request to connect to the wireless communication dongle of the information handling system under either situation of block 416 or block 420 above. For example, after the wireless IO device 380 transmits the connection request 310, the wireless radio system for the wireless IO device 380 may switch to a RX mode to listen for a polling packet 320 with instructions for a new data packet communication frame 340. The controller of the wireless communications dongle 330 or the information handling system 300 integrated wireless radio system executing code instructions of the wireless IO device synchronized wakeup and packet polling system in an embodiment may generate an initial polling packet 320 that instructs each of the wireless IO devices (e.g., 380) paired with the wireless communications dongle 330 or the information handling system 300 to transmit a plurality of data packets of a specified length and at specified time slots during a first data packet communication frame between the wireless communications dongle 330 or the information handling system 300 and each of the paired wireless IO devices (e.g., 380).

At block 422, the wireless IO device in an embodiment may resume one or more data packet communication frames with the wireless communication dongle. For example, the wireless IO device 380 may resume one or more data packet communication frames (e.g., 340) with the wireless communication dongle 330 or the information handling system 300.

The controller of the wireless communication dongle or the information handling system in an embodiment at block 424 may determine whether the dongle or the information handling system has powered down. If the wireless communication dongle or the information handling system has powered down in an embodiment, there may be no need or no capability to switch the dongle wireless radio system to a RX mode for further communication with the IO device, and the method may then end. If the wireless communication dongle or the information handling system has not powered down in an embodiment, the method may proceed back to block 406 to execute one or more data packet communication frames with the wireless communication dongle. In such a way, the wireless IO device synchronized wakeup and packet polling system may decrease the frequency of polling or ACK data packets transmitted, and the frequency of mode-switching described above with respect to existing systems. This may further decrease power consumed by rapid mode-switching and unnecessary polling. The method for a wireless IO device initiating a wake method upon a wake event to switch a paired wireless communication dongle from a sleep or low power receive (RX) mode to a transmit (TX) mode may then end.

Figure 5:
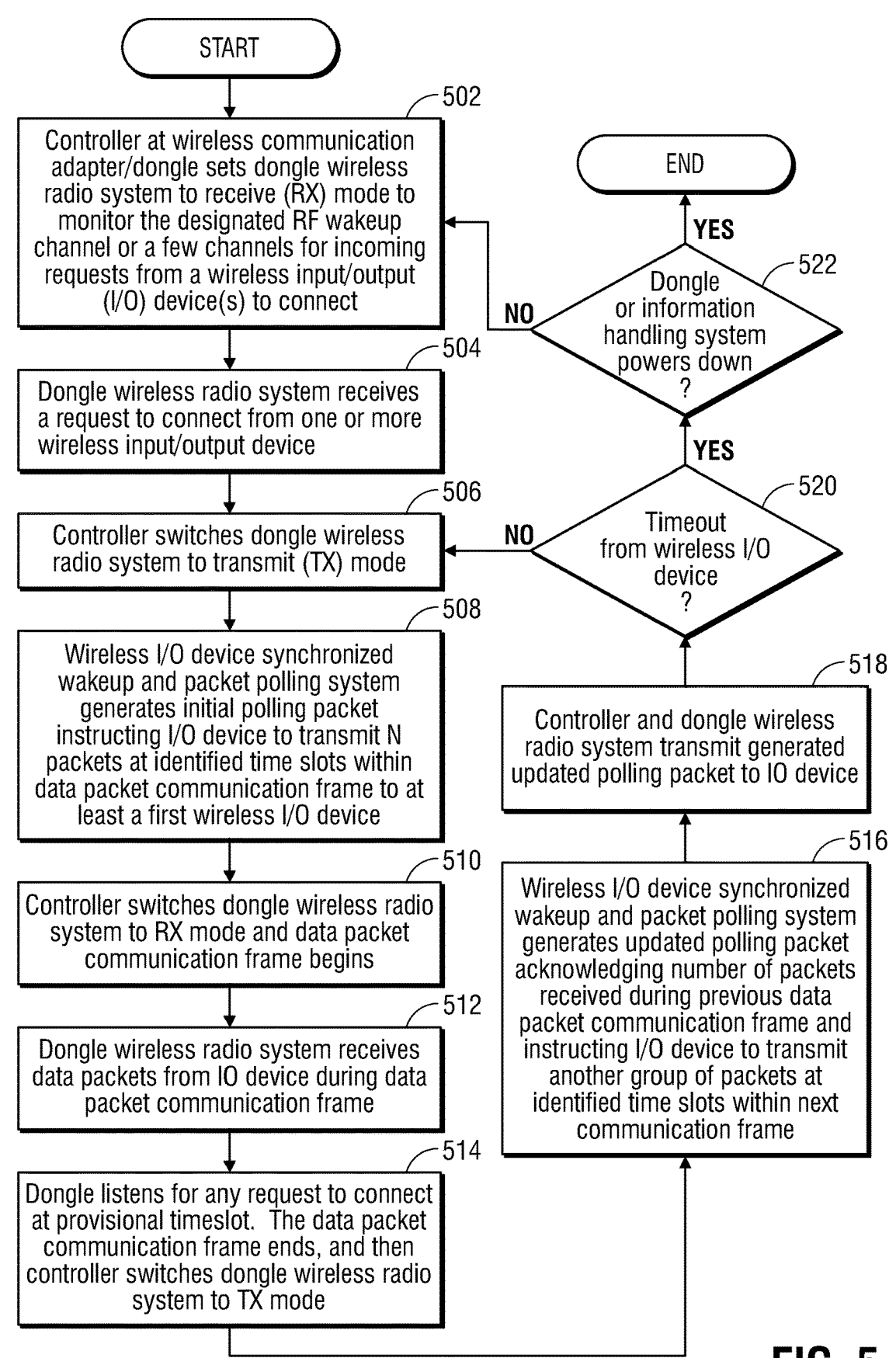
FIG. 5 is a flow diagram illustrating a method of waking a wireless IO device and wireless dongle and orchestrating transmission of data packets from one or more wireless IO devices to a wireless radio adaptor or wireless communication dongle according to an embodiment of the present disclosure.

FIG. 5 is a flow diagram illustrating a method of orchestrating a wake event and transmission of data packets from one or more wireless IO devices to a wireless communication dongle during a data packet communication frame to decrease power consumption, decrease use of airtime causing band congestion according to an embodiment of the present disclosure. As described herein, many manufacturers of wireless IO devices (e.g., mouse, keyboard, headset, virtual reality peripheral devices) for pairing wirelessly with an information handling system build these devices to provide the most basic or rudimentary communication capabilities. For example, many existing wireless IO devices are designed to communicate with a wireless communications dongle using a one reception/one transmission (1RX/1TX) format in which each time the wireless communications dongle operating in receive mode receives a data packet, it must then switch to transmit mode and transmit an ACK data packet back to the wireless IO device from which the initial data packet was received. The wireless communications dongle may then switch back to a receive mode to receive the next data packet from the wireless IO device. This process may be repeated each time a new data packet is generated at the wireless IO device, for example.

Each of these transmission/reception mode switches consumes power, causes delay and reduced throughput, and increases use of airtime causing band congestion. This may further cause the customer to experience reduced performance between their input via the wireless IO device (e.g., movement of the mouse) and the corresponding feedback displayed by the information handling system (e.g., movement of the cursor), or may cause the cursor to jump suddenly from one position to another (e.g., when the wireless mouse opts to skip resend of the missed packet). As a result, existing systems employing this 1RX/1TX approach may fail to meet customer needs for operational data throughput during execution of latency-sensitive software applications such as gaming applications or other high definition audio/visual applications. Further, during a wireless IO device entering sleep mode, the wireless communication dongle or wireless adapter of an information handling system may periodically poll the paired wireless IO device. This may unnecessarily cause additional power consumption and airtime congestion and in some embodiments may have the wireless IO device radio remain on. The wireless IO device synchronized wakeup and packet polling system in embodiments herein may orchestrate coordinated low power wake up and scheduled reception of a plurality of data packets from each of a plurality of wireless IO devices between transmission of ACK data packets to each of those wireless IO devices to provide reduced airtime congestion, higher data throughputs, and improved performance while also reducing energy waste.

At block 502, a controller for a wireless communication dongle or a network interface device for an information handling system may set a wireless radio system to a receive (RX) mode in an embodiment. A low-power RX mode may be initiated upon determination that a wireless IO device has entered a sleep mode. For example, after a polling packet listening timer has run or a polling packet transmittal count threshold has been reached without the wireless IO device 380 transmitting packet frames to the wireless communications dongle 330 or the information handling system 300 this may indicate the wireless IO device is in sleep mode 301. The wireless communications dongle 330 or the information handling system 300 may then be set in a low-power listening RX mode 303. While in this RX mode 303 in an embodiment, the wireless radio system may listen in a low-power mode only on the one or limited number of designated Radio Frequency (RF) wake channels assigned to the wireless IO device for transmission of connection requests. For example, in an embodiment described above with respect to FIG. 3, a wireless radio system of the wireless communications dongle 330 or the information handling system 300 may listen to a designated RF wake channel assigned to the wireless IO device 380 during an initial pairing session for communication between the wireless IO device 380 and the wireless communications dongle 330 or the information handling system 300. Listening on only a limited number of RF channels in such a way may conserve power at the wireless communications dongle 330 or information handling system 300 during a low-power sleep mode.

The wireless radio system in an embodiment at block 504 may receive one or more requests to connect from one or more wireless IO devices. For example, while in this RX mode 303, the wireless radio system of the wireless communications dongle 330 or the information handling system 300 may receive a request to connect 310 with the wireless communications dongle 330 or the information handling system 300 upon a wake event 304 occurring at the wireless IO device 380. In some cases, this request to connect 310 may be transmitted by the wireless IO device 380, following the wake event 304 and a waking cycle of the wireless IO device 380 from a sleep state. More specifically, as described in greater detail above, the wireless IO device 380 may transmit such a request to connect 310 after waking from a sleep state.

The connection request 310 in some embodiments may include an identification of the model number or various default communication metrics for the mouse 380 or other identifying information for the mouse 380 that the wireless communications dongle 330 or the information handling system 300 may use to access stored information identifying such default communications metrics. For example, the connection request 310 may include a standard data packet transmission rate (e.g., 80 Kilobits per second (Kbps)), or standard data packet transmission length (e.g., 23 bytes or 184 bits) for the mouse 380. As another example, the connection request 310 may include identification for the mouse 380 that is associated with a profile stored at the wireless communications dongle 330 or the information handling system 300 providing such standard data packet transmission rate or standard data packet transmission length or capabilities of the mouse for data throughput levels.

At block 506, the controller of the wireless communication dongle or the information handling system may switch the wireless radio system to a transmit (TX) mode for transmission of an initial polling packet for synchronizing delivery of data packets between the wireless IO device and the wireless communication dongle or information handling system. For example, upon successful receipt of the connection requested at block 504 above, the wireless communications dongle 330 or the information handling system 300 may switch to a transmit (TX) mode 312.

The controller of the wireless communications dongle or the information handling system executing code instructions of the wireless IO device synchronized wakeup and packet polling system in an embodiment at block 508 may generate an initial polling packet. For example, the controller of the wireless communications dongle 330 or the information handling system 300 executing code instructions of the wireless IO device synchronized wakeup and packet polling system in an embodiment may generate an initial polling packet 320 that instructs each of the wireless IO devices (e.g., 380) paired with the wireless communications dongle 330 or the information handling system 300 to transmit a plurality of data packets of a specified length and at specified time slots during a first data packet communication frame 340 between the wireless communications dongle 330 or the information handling system 300 and each of the paired wireless IO devices (e.g., 380). The controller of the wireless communications dongle 330 or the information handling system 300 executing code instructions of the wireless IO device synchronized wakeup and packet polling system in an embodiment may determine an initial wireless IO device frame data packet number, initial wireless IO device frame data packet length, or initial allotted data packet transmission time slots for receipt of data packets transmitted from the wireless IO device 380 based on default initial values that apply to any paired wireless IO device 380 or to a wireless IO device 380 identifiable based on information given within the request to connect received at block 504. For example, the controller of the wireless communications dongle 330 or the information handling system 300 executing code instructions of the wireless IO device synchronized wakeup and packet polling system may determine an initial wireless IO device frame data packet number of N=five, initial wireless IO device frame data packet length of 23 bytes (B), or initial allotted data packet transmission time slots of N=5 time slots every 0.000167 seconds (167 μs) for receipt of data packets transmitted from the wireless IO device 380 within a data packet communication frame having a total length of 0.000833 seconds. The controller of the wireless communications dongle 330 or the information handling system 300 may instruct the wireless radio system to transmit an initial polling packet 320 containing the initial wireless IO device frame data packet number, the initial wireless IO device frame data packet length, and initial allotted data packet transmission time slots to the wireless IO device or devices (e.g., 380). This initial polling packet 320 in an embodiment may synchronize communication between the wireless communications dongle 330 or the information handling system 300 and the wireless IO device 380 for a data packet communication frame beginning at a specified time and having the specified duration (e.g., 0.000833 seconds) and number of packets N (e.g., N=5).

At block 510, the controller for the wireless communication dongle or the information handling system may switch the wireless radio system to RX mode for receipt of a first data packet within a data packet communication frame. For example, in an embodiment described with respect to FIG. 3, upon transmission of the initial polling packet 320 in an embodiment, the controller for the wireless communications dongle 330 or the information handling system 300 may switch the wireless radio system into a receive mode at 321 to await the beginning of the data packet communication frame 340 with the wireless IO device 380. At the time specified within the initial polling packet 320 in an embodiment, the data packet communication frame 340 may begin with receipt of a first packet 350 responsive to the initial polling packet 320 from the wireless IO device 380. In an embodiment, the first packet 350 for the data packet communication frame 340 may adhere to the instructions received within the initial polling packet 320. For example, in an embodiment, the first packet 350 and other packets up to N packets 360 may have a length equivalent to the initial wireless IO device frame data packet length of 23 Bytes and may be delivered at the synchronized time designating the beginning of the data packet communication frame 340 within the N packets (e.g., first of N=five packets) in line with the initial allotted data packet transmission time slots, as defined within the initial polling packet 320. In other embodiments, as described in greater detail with respect to FIGS. 4A, 4B, 4C, and FIG. 6 below, this first packet 350 may further include a request to adjust the initial wireless IO device frame data packet number, initial wireless IO device frame data packet length, or initial allotted data packet time slots.

The wireless radio system of the wireless communication dongle or information handling system in an embodiment at block 512 may receive a plurality of data packets from one or more wireless IO devices during a first data packet communication frame. For example, during the data packet communication frame 340 in an embodiment, the wireless radio system of the wireless communication dongle 330 or the information handling system 300 may receive a plurality of data packets equivalent to the initial wireless IO device frame data packet number N or M as defined within the initial polling packet 320. More specifically, in an embodiment in which the initial polling packet 320 identified an initial wireless IO device frame data packet number of N=five, the Nth packet 360 received by the wireless radio system of the wireless communication dongle 330 or the information handling system 300 may be the fifth of five data packets transmitted during the data packet communication frame 340 from the wireless IO device 380 to the wireless communication dongle 330 or the information handling system 300. Each of the five data packets transmitted to the wireless communication dongle 330 or the information handling system 300 in an embodiment may have the initial wireless IO device frame data packet number and initial wireless IO device frame data packet length and may be transmitted at the designated initial allotted data packet transmission time slots identified within the initial polling packet 320.

A microcontroller executing code instructions of the wireless IO device synchronized wakeup and packet polling system at the wireless communications dongle 330 or the information handling system 300 may ensure that, during this data packet communication frame 340, the wireless radio system remains in a receive mode to receive data packets from the one or more paired wireless IO devices (e.g., 380). In other words, the controller of the wireless communications dongle 330 or the information handling system 300 may avoid any power loss or use of airtime causing band congestion due to a reduction in rapid switching between RX/TX modes during this data packet communication frame 340.

At block 514, the data packet communication frame orchestrated according to the initial polling packet transmitted at block 508 may receive a last packet. In some embodiments, an additional abbreviate span of time in the data packet frame may be allotted for a reserved provisional timeslot to permit joinder of additional wireless IO devices via a request to connect at the reserved provisional timeslot in accordance with plural wireless IO device embodiments herein. At this point the data packet communication frame may end with or without a new connection request to join an additional wireless IO device and the controller for the wireless communication dongle or information handling system may switch the dongle wireless radio system to the TX mode in an embodiment. For example, in an embodiment described with reference to FIG. 3, following the data packet communication frame 340 and time or number of packets allocated for the same, the controller of the wireless communications dongle 330 or the information handling system 300 may switch the wireless radio system to a TX mode at 342 for transmitting an updated polling packet with acknowledgment of received data packets and orchestrating a future data packet communication frame for one or more wireless IO devices.

The controller for the wireless communication dongle or information handling system in an embodiment at block 516 may generate an updated polling packet acknowledging the number of packets received during the previous data packet communication frame to each paired wireless IO device (e.g., N packets or M packets). The updated polling packet in an embodiment may further include instructions for the one or more paired wireless IO devices to transmit another designated number (e.g., N, N+1, N−1) of data packets at identified time slots with updated times within a second data packet communication frame. For example, the controller in an embodiment may execute code instructions of the wireless IO device synchronized wakeup and packet polling system to generate an updated polling packet 370. In an embodiment, such an updated polling packet 370 may include an acknowledgement header (ACK) identifying the number (N) of packets received during the previous data packet communication frame 340. For example, in an embodiment in which the Nth packet 360 is the fifth of five packets allotted to the wireless IO device 380 for transmission within the data packet communication frame 340 within the initial polling packet 320, such an updated polling packet 370 may acknowledge receipt of five packets.

The updated polling packet 370 in an embodiment may further include updated instructions for synchronizing transmission of data packets within a second, later data packet communication frame. For example, the updated polling packet 370 may provide an updated time for initiation of such a second, later data packet communication frame for N packets again. In other embodiments, the wireless IO device synchronized wakeup and packet polling system may have received an adjustment request and the updated polling packet may instruct adjustment to one or more of the allotted data packet number, allotted data packet length, or allotted data packet transmission time slots for the wireless IO device 380. In an example embodiment, the updated polling packet 370 identifying an updated time for initiation of a second, later data packet communication frame may also provide an updated allotted data packet number equivalent to the initial wireless IO device frame data packet number. In another example, in an embodiment, the updated polling packet 370 may also provide an updated allotted data packet length equivalent to the initial wireless IO device frame data packet length. In still another example, in an embodiment, the updated polling packet 370 may also provide updated allotted data packet time slots having the same positions within the second data packet communication frame as the positions of the initial allotted data packet transmission time slots within the first data packet communication frame 340. In yet other embodiments, the updated polling packet may reflect requested adjustments to the data packet communication frame.

Transmission of an initial polling packet 320 prior to a scheduled data packet communication frame 340 and transmission of an updated polling packet 370 following the scheduled data packet communication frame 340 for orchestrating an upcoming second data packet communication frame may minimize the number of acknowledgement packets transmitted from the wireless communication dongle 330 or information handling system 300 and minimize the frequency with which switches between TX mode and RX mode are required. In such a way, the wireless IO device synchronized wakeup and packet polling system may decrease the frequency of ACK data packets transmitted and occupying airtime, and the frequency of mode-switching described above with respect to existing systems. This may further decrease power consumed by rapid mode-switching, decrease latency, and improve overall data throughput and user experience.

At block 518, the controller for the wireless communication dongle or information handling system in an embodiment may instruct the wireless radio system to transmit the updated polling packet generated at block 516 to one or more paired wireless IO devices. For example, in an embodiment described with respect to FIG. 3, the controller for the wireless communication dongle 330 or the information handling system 300 in an embodiment may execute code instructions of the wireless IO device synchronized wakeup and packet polling system to instruct the wireless radio system to transmit an updated polling packet 370.

The controller of the wireless communication dongle or the information handling system in an embodiment at block 520 may determine whether the wireless IO device has timed out, indicating it has entered a sleep mode. In order to detect such a scenario in which the wireless IO device 380 has entered a sleep mode 301, the controller of the wireless communication dongle 330 or the information handling system 300 executing code instructions of the wireless IO device synchronized wakeup and packet polling system in an embodiment may place the wireless communications dongle 330 or wireless radio system of the information handling system 300 in a RX mode to detect incoming data packets from the wireless IO device 380. This controller may also initiate a device responsiveness timer having a preset duration (e.g., two minutes, five minutes, ten minutes) or a threshold count of polling packets without responsive data packets as a timeout period 302. This timer may begin to run upon transmission of the updated polling packet 370 by the wireless radio system of the wireless communication dongle 330 or information handling system 300. If no further data packets are received from the wireless IO device 380 before the device responsiveness timer expires or the threshold polling packet count is met, this may indicate that the wireless IO device 380 has been powered down or entered a sleep mode. In another example embodiment, the controller for the wireless communication dongle 330 or wireless radio system of information handling system 300 executing code instructions of the wireless IO device synchronized wakeup and packet polling system may transmit a second updated polling packet (not shown), following the last time slot allotted to the wireless IO device 380 within the updated polling packet 370 (e.g., indicating no receipt of any data packets during the data packet communication frame following the updated polling packet 370). One or more of such updated polling packets indicating failure to receive any data packets from the wireless IO device 380 may be transmitted by the wireless radio system of the wireless communications dongle 330 or information handling system 300, up to a threshold polling packet number (e.g., one, three, five, ten, etc.), at which time it may be assumed that the wireless IO device 380 has entered a sleep state 301. If the wireless IO device has timed out, the method may proceed to block 522 to determine whether the wireless communications dongle or information handling system has also shut down. If the wireless IO device has not timed out, the method may proceed back to block 506 to return the wireless communication dongle into a TX mode for transmission of an updated polling packet. By repeating the loop between blocks 506 and 520 in such a way, the wireless IO device synchronized wakeup and packet polling system in an embodiment may place the wireless communication dongle or wireless radio system of the information handling system into a low-power sleep mode to listen on a limited number of RF channels when the wireless IO device has entered a sleep mode.

At block 522, in an embodiment in which the wireless IO device has timed out, the controller of the wireless communication dongle or the information handling system in an embodiment may determine whether the dongle or the information handling system has powered down. If the wireless communication dongle or the information handling system has powered down in an embodiment, there may be no need or no capability to switch the dongle wireless radio system to a RX mode for further communication with the IO device, and the method may then end. If the wireless communication dongle or the information handling system has not powered down in an embodiment, the method may return to block 502. In such an embodiment, the wireless radio system for the wireless communications dongle 330 or information handling system 300 may then listen only on the designated RF Wake channel(s) for requests to connect with the wireless communication dongle or the information handling system from the wireless IO device 380. In such a way, the wireless IO device synchronized wakeup and packet polling system may decrease the frequency of polling and transmissions as well as reduce the number of ACK data packets transmitted, and the frequency of mode-switching during orchestrated wireless BLE packet communications between a wireless communications dongle and a wireless IO device while improving performance. This may further decrease power consumed by rapid mode-switching and unnecessary polling of both wireless IO devices and the wireless communication dongle.

The blocks of the flow diagrams of FIGS. 4 and 5 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A wireless input/output (IO) device synchronized wakeup and packet polling system of a wireless communication dongle at an information handling system comprising:

a controller to execute code instructions of the wireless IO device synchronized wakeup and packet polling system to place a wireless radio system at the wireless communication dongle in a receive (RX) mode to monitor a designated radio frequency (RF) wake channel upon detection of no wireless communications from an operatively coupled wireless IO device for more than a timeout period to enable expedient wake-up of the wireless communication dongle and reducing initial polling packet transmissions;

the controller to receive a request to connect on the designated RF wake channel from the wireless IO device upon a wake event at the wireless IO device;

the controller to wake the wireless communication dongle immediately upon receiving the request to connect on the designated RF wake channel and to respond to receipt of the request to connect by instructing the wireless radio system of the wireless communication dongle to switch to a transmit (TX) mode and to transmit an initial polling packet to poll the wireless IO device with instructions for a data packet communication frame having an initial wireless IO device frame data packet number, an initial wireless IO device frame data packet length, and initial wireless IO device allotted data packet transmission time slots for orchestrating transmission of data packets from the wireless IO device to the wireless communication dongle;

the controller to switch the wireless radio system of the wireless communication dongle to receive the data packet communication frame from the wireless IO device; and the controller to execute code instructions to transmit with the wireless radio system a second, updated polling packet acknowledging receipt of the initial wireless IO device frame data packet number and instructing the wireless IO device for transmission of a second data packet communication frame.

2. The wireless input/output (IO) device synchronized wakeup and packet polling system of the wireless communication dongle of claim 1, wherein the wireless IO device is a mouse.

3. The wireless input/output (IO) device synchronized wakeup and packet polling system of the wireless communication dongle of claim 1, wherein the wireless radio system of the wireless communication dongle in the RX mode monitors up to two designated RF wake channels for the request to connect.

4. The wireless input/output (IO) device synchronized wakeup and packet polling system of the wireless communication dongle of claim 1, wherein the wireless IO device communicates with the operatively coupled wireless communication dongle via a wireless link established according to the Bluetooth® Low Energy (BLE) radio layer protocol.

5. The wireless input/output (IO) device synchronized wakeup and packet polling system of the wireless communication dongle of claim 1, wherein the second, updated polling packet further identifies a second, updated wireless IO device frame data packet number that is adjusted from the initial wireless IO device frame data packet number.

6. The wireless input/output (IO) device synchronized wakeup and packet polling system of the wireless communication dongle of claim 1 further comprising:

the controller executing code instructions of the wireless IO device synchronized wakeup and packet polling system to place the wireless radio system in a low power state during RX mode, while monitoring the designated RF wake channel.

7. The wireless input/output (IO) device synchronized wakeup and packet polling of the wireless communication dongle of claim 1 further comprising:

the controller to execute code instructions of the wireless IO device synchronized wakeup and packet polling system to transmit via the wireless radio system the designated radio frequency wake channel for future transmission of requests to connect from the wireless IO device during a wakeup cycle during pairing with the wireless IO device.

8. A method of operating a wireless input/output (IO) device and wireless communication dongle synchronized wakeup and packet polling comprising:

activating a wireless radio system of a wireless communication dongle in a receive (RX) mode, via a controller executing code instructions of a wireless IO device synchronized wakeup and packet polling system to monitor a designated Radio Frequency (RF) wake channel in a Bluetooth® Low Energy (BLE) wireless communication RF band upon detection of no received data from an operatively coupled wireless IO device for a timeout period to reduce initial polling packet transmissions from the wireless communication dongle;

responding, via the controller of the wireless communication dongle, to receipt of a request to connect from the wireless IO device on the designated RF wake channel upon a wake event at the wireless IO device, by switching the wireless radio system at the wireless communication dongle to a transmit (TX) mode for transmission of an initial polling packet to poll the wireless IO device identifying an initial frame data packet number and an initial frame data packet length in allotted data packet transmission time slots for orchestrating transmission of data packets from the wireless IO device to the wireless communication dongle in a data packet frame of plural data packets;

switching the wireless radio system of the wireless communication dongle, via the controller, to receive the data packet communication frame with the initial frame data packet number at the allotted data packet transmission time slots from the wireless IO device; and switching the wireless radio system, via the controller, to transmit a second, updated polling packet acknowledging receipt of the initial frame data packet number of data packets and instructing the wireless IO device for transmission of a second data packet communication frame.

9. The method of claim 8, wherein the wireless IO device is a mouse.

10. The method of claim 8, wherein the wireless radio system of the wireless communication dongle in the RX mode monitors up to two designated RF wake channels for the request to connect.

11. The method of claim 8, wherein the second, updated polling packet further identifies a second, updated wireless IO device frame data packet number that is adjusted from the initial frame data packet number.

12. The method of claim 8 further comprising:

detecting the timeout period without received data from the wireless IO device based on failure of the wireless IO device to transmit data packets within the second data packet communication frame to the wireless communication dongle.

13. The method of claim 8 further comprising:

activating, via the controller, the wireless radio system of the wireless communication dongle in a low power state during RX mode to monitor the designated RF wake channel.

14. The method of claim 8 further comprising:

transmitting, via the wireless radio system of the wireless communication dongle, the designated radio frequency wake channel for future transmission of future requests to connect from the wireless IO device during a wakeup cycle during pairing with the wireless IO device.

15. A wireless input/output (IO) device synchronized wakeup and packet polling system of a wireless communication dongle at an information handling system comprising:

the controller to execute code instructions of the wireless IO device synchronized wakeup and packet polling system to transmit, via a wireless radio system of the wireless communication dongle, the designated radio frequency wake channel to an operatively coupled wireless IO device to transmit requests to connect during a wakeup cycle of the wireless IO device;

a controller to execute code instructions of the wireless IO device synchronized wakeup and packet polling system to place a wireless radio system in a receive (RX) mode to monitor a designated radio frequency (RF) wake channel upon detection of no wireless communications from the wireless IO device for greater than a timeout period to reduce initial polling packet transmissions from the wireless communication dongle;

the controller to receive a request to connect on the designated RF wake channel at the wireless communication dongle from the wireless IO device upon a wake event at the wireless IO device;

the controller to respond to receipt of the request to connect by instructing the wireless radio system of the wireless communication dongle to switch to a transmit (TX) mode and to transmit an initial polling packet to poll the wireless IO device with instructions for a data packet communication frame having an initial wireless IO device frame data packet number for orchestrating transmission of data packets from the wireless IO device to the wireless communication dongle;

the controller to switch the wireless radio system of the wireless communication dongle to receive the data packet communication frame with the initial wireless IO device frame data packet number from the wireless IO device; and the controller to execute code instructions to transmit with the wireless radio system a second, updated polling packet acknowledging receipt of the initial wireless IO device frame data packet number and instructing the wireless IO device for transmission of a second data packet communication frame.

16. The wireless IO device synchronized wakeup and packet polling system of the wireless communication dongle of claim 1, wherein the wireless IO device is a mouse.

17. The wireless IO device synchronized wakeup and packet polling system of the wireless communication dongle of claim 15, wherein the wireless radio system of the wireless communication dongle in the RX mode monitors up to two designated RF wake channels for the request to connect.

18. The wireless IO device synchronized wakeup and packet polling system of the wireless communication dongle of claim 15, wherein the wireless IO device communicates with the operatively coupled wireless communication dongle via a wireless link established according to the Bluetooth® Low Energy (BLE) radio layer protocol with Gaussian Frequency Shift Keying data modulation.

19. The wireless IO device synchronized wakeup and packet polling system of the wireless communication dongle of claim 15, wherein the second, updated polling packet further identifies a second, updated wireless IO device frame data packet number that is adjusted from the initial wireless IO device frame data packet number.

20. The wireless IO device synchronized wakeup and packet polling system of the wireless communication dongle of claim 15 further comprising:

the controller executing code instructions of the wireless IO device synchronized wakeup and packet polling system to place the wireless radio system in a low power state during RX mode while monitoring the designated RF wake channel.

\* \* \* \* \*